US011989256B2

(12) United States Patent
Ronagh et al.

(10) Patent No.: US 11,989,256 B2
(45) Date of Patent: *May 21, 2024

(54) METHOD AND SYSTEM FOR SOLVING THE LAGRANGIAN DUAL OF A CONSTRAINED BINARY QUADRATIC PROGRAMMING PROBLEM USING A QUANTUM ANNEALER

(71) Applicant: 1QB INFORMATION TECHNOLOGIES INC., Vancouver (CA)

(72) Inventors: Pooya Ronagh, Vancouver (CA); Ehsan Iranmanesh, Burnaby (CA); Brad Woods, Vancouver (CA)

(73) Assignee: 1QB INFORMATION TECHNOLOGIES INC., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,882

(22) Filed: Oct. 19, 2022

(65) Prior Publication Data

US 2023/0222173 A1    Jul. 13, 2023

Related U.S. Application Data

(63) Continuation of application No. 16/809,473, filed on Mar. 4, 2020, now Pat. No. 11,514,134, which is a (Continued)

(30) Foreign Application Priority Data

Feb. 3, 2015 (CA) .............................. CA 2881033

(51) Int. Cl.
*G06F 17/11* (2006.01)
*G06N 5/01* (2023.01)
*G06N 10/00* (2022.01)

(52) U.S. Cl.
CPC .............. *G06F 17/11* (2013.01); *G06N 5/01* (2023.01); *G06N 10/00* (2019.01)

(58) Field of Classification Search
CPC ...................................................... G06F 17/11
(Continued)

(56) References Cited

U.S. PATENT DOCUMENTS 6,221,592 B1  4/2001  Schwartz et al.
7,113,967 B2  9/2006  Cleve et al.
(Continued)

FOREIGN PATENT DOCUMENTS

CA    2840958 A1    1/2013
CA    2881033 A1    4/2015
(Continued)

OTHER PUBLICATIONS

Boixo, et al., "Fast quantum algorithms for traversing paths of eigenstates," 2010, arXiv preprint arXiv:1005.3034, 36 pgs.
(Continued)

*Primary Examiner* — Eric D Lee
(74) *Attorney, Agent, or Firm* — Wilson Sonsini Goodrich & Rosati

(57) ABSTRACT

A method is disclosed for solving the Lagrangian dual of a constrained binary quadratic programming problem. The method comprises obtaining a constrained quadratic binary programming problem; until a convergence is detected, iteratively, performing a Lagrangian relaxation of the constrained quadratic binary programming problem to provide an unconstrained quadratic binary programming problem, providing the unconstrained quadratic binary programming problem to a quantum annealer, obtaining from the quantum annealer at least one corresponding solution, using the at least one corresponding solution to generate a new approximation for the Lagrangian dual bound; and providing a
(Continued)

corresponding solution to the Lagrangian dual of the constrained binary quadratic programming problem after convergence.

20 Claims, 6 Drawing Sheets

Related U.S. Application Data continuation of application No. 15/014,576, filed on Feb. 3, 2016, now abandoned.

(58) Field of Classification Search
USPC .......................................................... 706/19
See application file for complete search history.

(56) References Cited

U.S. PATENT DOCUMENTS

| | | | |
|---|---|---|---|
| 7,135,701 | B2 | 11/2006 | Amin et al. |
| 7,234,144 | B2 | 6/2007 | Wilt et al. |
| 7,418,283 | B2 | 8/2008 | Amin et al. |
| 7,533,068 | B2 | 5/2009 | Maassen Van Den Brink et al. |
| 7,619,437 | B2 | 11/2009 | Thom et al. |
| 7,639,035 | B2 | 12/2009 | Berkley |
| 7,660,533 | B1 | 2/2010 | Meyers et al. |
| 7,805,079 | B1 | 9/2010 | Meyers et al. |
| 7,898,282 | B2 | 3/2011 | Harris et al. |
| 7,984,012 | B2 | 7/2011 | Coury et al. |
| 8,008,942 | B2 | 8/2011 | Van Den Brink et al. |
| 8,126,649 | B2 | 2/2012 | Frasch et al. |
| 8,175,995 | B2 | 5/2012 | Amin |
| 8,195,596 | B2 | 6/2012 | Rose et al. |
| 8,195,726 | B2 | 6/2012 | Macready et al. |
| 8,219,605 | B2 | 7/2012 | Cowlishaw et al. |
| 8,230,432 | B2 | 7/2012 | Bryant et al. |
| 8,244,504 | B1 | 8/2012 | Jacobs |
| 8,244,662 | B2 | 8/2012 | Coury et al. |
| 8,283,943 | B2 | 10/2012 | Van Den Brink et al. |
| 8,374,828 | B1 | 2/2013 | Jacobs et al. |
| 8,421,053 | B2 | 4/2013 | Bunyk et al. |
| 8,503,885 | B2 | 8/2013 | Meyers et al. |
| 8,655,828 | B2 | 2/2014 | Rose |
| 8,832,165 | B2 | 9/2014 | Allen et al. |
| 9,537,953 | B1 | 1/2017 | Dadashikelayeh et al. |
| 9,660,859 | B1 | 5/2017 | Dadashikelayeh et al. |
| 9,727,824 | B2 | 8/2017 | Rose et al. |
| 9,870,273 | B2 | 1/2018 | Dadashikelayeh et al. |
| 9,881,256 | B2 | 1/2018 | Hamze et al. |
| 10,044,638 | B2 | 8/2018 | Dadashikelayeh et al. |
| 10,152,358 | B2 | 12/2018 | Dadashikelayeh et al. |
| 10,223,084 | B1 | 3/2019 | Dunn |
| 10,339,466 | B1 | 7/2019 | Ding et al. |
| 10,346,748 | B2 | 7/2019 | Aspuru-Guzik et al. |
| 10,484,479 | B2 | 11/2019 | Johnson et al. |
| 10,558,932 | B1 | 2/2020 | Neven et al. |
| 10,614,370 | B2 | 4/2020 | Johnson et al. |
| 10,713,582 | B2 | 7/2020 | Dadashikelayeh |
| 10,824,478 | B2 | 11/2020 | Dadashikelayeh et al. |
| 10,826,845 | B2 | 11/2020 | Dadashikelayeh et al. |
| 10,929,294 | B2 | 2/2021 | Brahm et al. |
| 11,017,289 | B2 | 5/2021 | Crawford et al. |
| 11,196,775 | B1 | 12/2021 | Badawy et al. |
| 11,205,275 | B2 | 12/2021 | Oami et al. |
| 11,514,134 | B2 | 11/2022 | Ronagh et al. |
| 11,797,641 | B2 | 10/2023 | Ronagh et al. |
| 2003/0005068 | A1 | 1/2003 | Nickel et al. |
| 2003/0121028 | A1 | 6/2003 | Coury et al. |
| 2004/0254735 | A1 | 12/2004 | Horn et al. |
| 2004/0267916 | A1 | 12/2004 | Chambliss et al. |
| 2005/0027458 | A1 | 2/2005 | Merz, Jr. et al. |
| 2005/0182614 | A1 | 8/2005 | Meredith |
| 2005/0187844 | A1 | 8/2005 | Chalermkraivuth et al. |
| 2005/0250651 | A1 | 11/2005 | Amin et al. |
| 2005/0273306 | A1 | 12/2005 | Hilton et al. |
| 2006/0221978 | A1 | 10/2006 | Venkatachalam |
| 2006/0225165 | A1 | 10/2006 | Maassen Van Den Brink et al. |
| 2007/0177634 | A1 | 8/2007 | Beausoleil et al. |
| 2007/0180586 | A1 | 8/2007 | Amin |
| 2007/0215862 | A1 | 9/2007 | Beausoleil et al. |
| 2007/0239366 | A1 | 10/2007 | Hilton et al. |
| 2008/0059547 | A1 | 3/2008 | Taylor |
| 2008/0065573 | A1* | 3/2008 | Macready ............... G06N 7/08 706/19 |
| 2008/0186918 | A1 | 8/2008 | Tinnakornsrisuphap et al. |
| 2008/0215850 | A1 | 9/2008 | Berkley et al. |
| 2008/0218519 | A1 | 9/2008 | Coury et al. |
| 2008/0262990 | A1 | 10/2008 | Kapoor et al. |
| 2008/0313430 | A1 | 12/2008 | Bunyk |
| 2009/0050357 | A1 | 2/2009 | Suzuki |
| 2009/0070402 | A1 | 3/2009 | Rose et al. |
| 2009/0078932 | A1 | 3/2009 | Amin |
| 2009/0164435 | A1 | 6/2009 | Routt |
| 2009/0182542 | A9 | 7/2009 | Hilton et al. |
| 2009/0306902 | A1 | 12/2009 | Lemmen et al. |
| 2009/0325694 | A1 | 12/2009 | Beckman et al. |
| 2010/0076913 | A1 | 3/2010 | Yang et al. |
| 2010/0261481 | A1 | 10/2010 | Resende et al. |
| 2010/0306142 | A1 | 12/2010 | Amin |
| 2011/0047201 | A1 | 2/2011 | Macready et al. |
| 2011/0231462 | A1 | 9/2011 | Macready et al. |
| 2011/0238378 | A1 | 9/2011 | Allen et al. |
| 2011/0238855 | A1 | 9/2011 | Korsunsky et al. |
| 2011/0296229 | A1 | 12/2011 | Cowlishaw et al. |
| 2012/0072579 | A1 | 3/2012 | Teather |
| 2012/0084242 | A1 | 4/2012 | Levin |
| 2012/0159506 | A1 | 6/2012 | Barham et al. |
| 2012/0215821 | A1 | 8/2012 | Macready et al. |
| 2012/0240185 | A1 | 9/2012 | Kapoor et al. |
| 2012/0253926 | A1 | 10/2012 | Chen et al. |
| 2012/0254586 | A1 | 10/2012 | Amin et al. |
| 2012/0278374 | A1 | 11/2012 | Cowlishaw et al. |
| 2012/0326720 | A1 | 12/2012 | Gambetta et al. |
| 2013/0026183 | A1 | 1/2013 | Foster |
| 2013/0144925 | A1 | 6/2013 | Macready et al. |
| 2013/0263131 | A1 | 10/2013 | Beda, III et al. |
| 2013/0308956 | A1 | 11/2013 | Meyers et al. |
| 2013/0336472 | A1 | 12/2013 | Fahlgren et al. |
| 2014/0025606 | A1 | 1/2014 | Macready |
| 2014/0067808 | A1 | 3/2014 | Narang et al. |
| 2014/0122702 | A1 | 5/2014 | Jung et al. |
| 2014/0123325 | A1 | 5/2014 | Jung et al. |
| 2014/0187427 | A1 | 7/2014 | Macready et al. |
| 2014/0214257 | A1 | 7/2014 | Williams et al. |
| 2014/0250288 | A1 | 9/2014 | Roy |
| 2014/0258730 | A1 | 9/2014 | Stecher |
| 2014/0324933 | A1 | 10/2014 | Macready et al. |
| 2014/0337612 | A1 | 11/2014 | Williams |
| 2014/0344322 | A1 | 11/2014 | Ranjbar |
| 2014/0365843 | A1 | 12/2014 | Ashikhmin |
| 2014/0379924 | A1 | 12/2014 | Das et al. |
| 2015/0006443 | A1 | 1/2015 | Rose et al. |
| 2015/0032991 | A1 | 1/2015 | Lanting et al. |
| 2015/0032993 | A1 | 1/2015 | Amin et al. |
| 2015/0055961 | A1 | 2/2015 | Meyers et al. |
| 2015/0106413 | A1 | 4/2015 | Ronagh |
| 2015/0111754 | A1 | 4/2015 | Harris et al. |
| 2015/0120551 | A1 | 4/2015 | Jung et al. |
| 2015/0120555 | A1 | 4/2015 | Jung et al. |
| 2015/0142398 | A1 | 5/2015 | Miller, III et al. |
| 2015/0169746 | A1 | 6/2015 | Hatami-Hanza |
| 2015/0178349 | A1 | 6/2015 | Niewodniczanski et al. |
| 2015/0193692 | A1 | 7/2015 | Israel |
| 2015/0205759 | A1 | 7/2015 | Israel et al. |
| 2015/0220852 | A1 | 8/2015 | Hatami-Hanza |
| 2015/0227559 | A1 | 8/2015 | Hatami-Hanza |
| 2015/0262074 | A1 | 9/2015 | Bruestle et al. |
| 2015/0269124 | A1 | 9/2015 | Hamze et al. |
| 2015/0269243 | A1 | 9/2015 | Kobayashi |
| 2015/0332994 | A1 | 11/2015 | Mallik et al. |
| 2015/0349960 | A1 | 12/2015 | Bagley |
| 2015/0358251 | A1 | 12/2015 | Varga et al. |
| 2015/0363358 | A1 | 12/2015 | Ronagh et al. |
| 2015/0363708 | A1 | 12/2015 | Amin et al. |

(56) References Cited

U.S. PATENT DOCUMENTS

| | | |
|---|---|---|
| 2016/0026183 A1 | 1/2016 | Williams et al. |
| 2016/0071021 A1 | 3/2016 | Raymond |
| 2016/0132785 A1 | 5/2016 | Amin et al. |
| 2016/0162798 A1 | 6/2016 | Marandi et al. |
| 2016/0171368 A1 | 6/2016 | Aspuru-Guzik et al. |
| 2016/0224515 A1 | 8/2016 | Ronagh et al. |
| 2016/0321559 A1 | 11/2016 | Rose et al. |
| 2016/0328253 A1 | 11/2016 | Majumdar |
| 2016/0328659 A1 | 11/2016 | Mohseni et al. |
| 2016/0338075 A1 | 11/2016 | McKibben |
| 2016/0342891 A1 | 11/2016 | Ross et al. |
| 2017/0011305 A1 | 1/2017 | Williams |
| 2017/0017894 A1 | 1/2017 | Lanting et al. |
| 2017/0060642 A1 | 3/2017 | Castellano et al. |
| 2017/0109605 A1 | 4/2017 | Ahn |
| 2017/0147303 A1 | 5/2017 | Amy et al. |
| 2017/0147695 A1 | 5/2017 | Shih |
| 2017/0214701 A1 | 7/2017 | Hasan |
| 2017/0223143 A1 | 8/2017 | Johnson et al. |
| 2017/0242824 A1 | 8/2017 | Karimi et al. |
| 2017/0255592 A1 | 9/2017 | Karimi et al. |
| 2017/0255629 A1 | 9/2017 | Thom et al. |
| 2017/0255872 A1 | 9/2017 | Hamze et al. |
| 2017/0286852 A1 | 10/2017 | Rezaie et al. |
| 2017/0286858 A1 | 10/2017 | La Cour et al. |
| 2017/0300808 A1 | 10/2017 | Ronagh et al. |
| 2017/0323195 A1 | 11/2017 | Crawford et al. |
| 2017/0344898 A1 | 11/2017 | Karimi et al. |
| 2017/0351974 A1 | 12/2017 | Rose et al. |
| 2017/0372427 A1 | 12/2017 | Johnson et al. |
| 2017/0373940 A1 | 12/2017 | Shahab et al. |
| 2018/0014970 A1 | 1/2018 | Conde De Paiva et al. |
| 2018/0039903 A1 | 2/2018 | Mosca et al. |
| 2018/0091440 A1 | 3/2018 | Dadashikelayeh et al. |
| 2018/0096085 A1 | 4/2018 | Rubin |
| 2018/0107526 A1 | 4/2018 | Dadashikelayeh et al. |
| 2018/0114138 A1 | 4/2018 | Monroe et al. |
| 2018/0204126 A1 | 7/2018 | Galle |
| 2018/0218279 A1 | 8/2018 | Lechner et al. |
| 2018/0218281 A1 | 8/2018 | Reinhardt et al. |
| 2018/0246851 A1 | 8/2018 | Zaribafiyan et al. |
| 2018/0260730 A1 | 9/2018 | Reagor et al. |
| 2018/0267937 A1 | 9/2018 | Pelc et al. |
| 2018/0308007 A1 | 10/2018 | Amin et al. |
| 2018/0314970 A1 | 11/2018 | Harris et al. |
| 2019/0009581 A1 | 1/2019 | Schalk et al. |
| 2019/0095811 A1 | 3/2019 | Antonio et al. |
| 2019/0205790 A1 | 7/2019 | Dukatz et al. |
| 2019/0251213 A1 | 8/2019 | Bishop et al. |
| 2019/0370680 A1 | 12/2019 | Novotny |
| 2019/0378047 A1 | 12/2019 | Pistoia et al. |
| 2020/0005186 A1 | 1/2020 | Romero et al. |
| 2020/0057957 A1 | 2/2020 | Johnson et al. |
| 2020/0090072 A1 | 3/2020 | Troyer et al. |
| 2020/0104740 A1 | 4/2020 | Cao |
| 2020/0125568 A1 | 4/2020 | Idicula et al. |
| 2020/0143910 A1 | 5/2020 | Noori et al. |
| 2020/0191943 A1 | 6/2020 | Wu et al. |
| 2020/0272684 A1 | 8/2020 | Karimi et al. |
| 2020/0279187 A1 | 9/2020 | Huang et al. |
| 2020/0364597 A1 | 11/2020 | Friedlander et al. |
| 2020/0364601 A1 | 11/2020 | Yamazaki et al. |
| 2020/0394537 A1 | 12/2020 | Wang et al. |
| 2020/0401920 A1 | 12/2020 | Killoran et al. |
| 2020/0410343 A1 | 12/2020 | Niu et al. |
| 2021/0103847 A1 | 4/2021 | Akzam |
| 2021/0125094 A1 | 4/2021 | Chamberland et al. |
| 2021/0166133 A1 | 6/2021 | Ronagh et al. |
| 2021/0166148 A1 | 6/2021 | Matsuura et al. |
| 2021/0279260 A1 | 9/2021 | Oberoi et al. |
| 2021/0287124 A1 | 9/2021 | Ronagh et al. |
| 2021/0289020 A1 | 9/2021 | Rolfe et al. |
| 2021/0304052 A1 | 9/2021 | Pant |
| 2021/0374611 A1 | 12/2021 | Ronagh et al. |
| 2022/0101172 A1 | 3/2022 | Lee et al. |
| 2022/0107927 A1 | 4/2022 | Vedaie et al. |
| 2023/0077665 A1 | 3/2023 | Kuttimalai et al. |
| 2023/0104058 A1 | 4/2023 | Hopfmueller et al. |
| 2023/0259385 A1 | 8/2023 | Rosenberg et al. |
| 2023/0334115 A1 | 10/2023 | Yildiz et al. |

FOREIGN PATENT DOCUMENTS

| | | |
|---|---|---|
| CA | 2902015 A1 | 1/2016 |
| CA | 2921711 A1 | 8/2017 |
| CA | 3026824 A1 | 12/2017 |
| CN | 106874506 A | 6/2017 |
| CN | 110069348 A | 7/2019 |
| EP | 3113084 A1 | 1/2017 |
| JP | 2004503011 A | 1/2004 |
| JP | 2006061926 A | 3/2006 |
| JP | 2008525873 A | 7/2008 |
| JP | 2013114366 A | 6/2013 |
| JP | 2016206795 A | 12/2016 |
| WO | WO-2005122052 A1 | 12/2005 |
| WO | WO-2006026985 A2 | 3/2006 |
| WO | WO-2007089674 A2 | 8/2007 |
| WO | WO-2007147243 A1 | 12/2007 |
| WO | WO-2010148120 A2 | 12/2010 |
| WO | WO-2013006836 A1 | 1/2013 |
| WO | WO-2014210368 A1 | 12/2014 |
| WO | WO-2015006494 A1 | 1/2015 |
| WO | WO-2015060915 A2 | 4/2015 |
| WO | WO-2015121619 A2 | 8/2015 |
| WO | WO-2016029172 A1 | 2/2016 |
| WO | WO-2017033326 A1 | 3/2017 |
| WO | WO-2017068228 A1 | 4/2017 |
| WO | WO-2017111937 A1 | 6/2017 |
| WO | WO-2017145086 A1 | 8/2017 |
| WO | WO-2017149491 A1 | 9/2017 |
| WO | WO-2017152289 A1 | 9/2017 |
| WO | WO-2017168865 A1 | 10/2017 |
| WO | WO-2017201626 A1 | 11/2017 |
| WO | WO-2017214717 A1 | 12/2017 |
| WO | WO-2018058061 A1 | 3/2018 |
| WO | WO-2018119522 A1 | 7/2018 |
| WO | WO-2018160599 A1 | 9/2018 |
| WO | WO-2019104440 A1 | 6/2019 |
| WO | WO-2019104443 A1 | 6/2019 |
| WO | WO-2019152020 A1 | 8/2019 |
| WO | WO-2019157228 A1 | 8/2019 |
| WO | WO-2019222748 A1 | 11/2019 |
| WO | WO-2019241879 A1 | 12/2019 |
| WO | WO-2019244105 A1 | 12/2019 |
| WO | WO-2020113339 A1 | 6/2020 |
| WO | WO-2020223718 A1 | 11/2020 |
| WO | WO-2020227825 A1 | 11/2020 |
| WO | WO-2020255076 A1 | 12/2020 |
| WO | WO-2021055000 A1 | 3/2021 |
| WO | WO-2021111368 A1 | 6/2021 |
| WO | WO-2021181281 A1 | 9/2021 |
| WO | WO-2021207847 A1 | 10/2021 |
| WO | WO-2021237350 A1 | 12/2021 |
| WO | WO-2021243454 A1 | 12/2021 |
| WO | WO-2022079640 A1 | 4/2022 |
| WO | WO-2022123494 A1 | 6/2022 |
| WO | WO-2022224143 A1 | 10/2022 |
| WO | WO-2023275825 A1 | 1/2023 |
| WO | WO-2023053035 A1 | 4/2023 |

OTHER PUBLICATIONS

Boixo et al., "Quantum state preparation by phase randomization," 2009, arXiv preprint arXiv:0903.1652.

Brassard, et al., "An exact quantum polynomial-time algorithm for Simon's problem," Proceedings of the Fifth Israeli Symposium on Theory of Computing and Systems, IEEE, 1997; 12 pgs.

Butenko, S., Maximum Independent Set and Related Problems, With Applications, A Dissertation Presented to the Graduate School of the University of Florida in Partial Fulfillment of the Requirements for the Degree of Doctor of Philosophy University of Florida, 167 pages (2003).

(56) References Cited

OTHER PUBLICATIONS

Co-pending U.S. Appl. No. 18/189,390, inventors Dadashikelayeh; Majid et al., filed Mar. 24, 2023.
Eidenbenz et al. Quantum Algorithm Implementations for Beginners. https://arxiv.org/abs/1804.03719, arXiv:1804.03719v1 [cs.ET ], Apr. 10, 2018, pp. 1-75) (Year: 2018).
Fan, et al. Robust Optimization of Graph Partitioning and Critical Node Detection in Analyzing Networks. In Combinatorial Optimization and Applications—4th International Conference, COCOA 2010, Proceedings (Part 1 ed., pp. 170-183). (Year: 2010).
Fan, et al. Robust optimization of graph partitioning involving interval uncertainty. Theoretical Computer Science. 447 (2012): 53-61.
Gibbons, L.E et al., Continuous Characterizations of the Maximum Clique Problem, DIMACS Technical Report 96-09, Center for Applied Optimization Dept of Industrial and Systems Engineering University of Florida, Gainesville, FL 32611, 19 pages (Apr. 1996).
Gibbons, L.E. et al., Continuous Characterizations of the Maximum Clique Problem, Mathematics of Operational Research 22(3):754-768 (Aug. 1997).
Glover et al. Tabu Search. Handbook of Combinatorial Optimization, Du DZ., Pardalos P.M. (eds), Springer, Boston, MA, 1998; 94 pgs.
Han et al., "Approximate computing: An emerging paradigm for energy-efficient design," 18th IEEE European Test Symposium (ETS), IEEE, 2013; https://ieeexplore.ieee.org/document/6569370.
Imamoglu, et al. Quantum information processing using quantum dot spins and cavity-QED. arXiv preprint quant-ph/9904096 (1999).
Inagaki, T., Combinatorial optimization using optical oscillator networks, J-Stage 33(5):586-591 (2018).
Kako, S. et al., Coherent Ising Machines with Error Correction Feedback, Advanced Quantum Technologies 3(2000045):14 pages (2020).
Krol et al., "Efficient decomposition of unitary matrices in quantum circuit compilers," 2021, arXiv preprint arXiv:2101.02993, 13 pgs.
Lamb, I.D.C. et al., An FPGA-based Instrumentation Platform for use at Deep Cryogenic Temperatures, arXiv:1509.06809 [physics. ins-det]:1-8 (2015).
Lavnikevich, N., (1, k)-Swap Local Search for Maximum Clique Problem, arXiv:1704.00908 [math.OC], 14 pages, submitted on Apr. 4, 2017, abstract, 3 pages.
Mao, et al. Artificial neural networks for feature extraction and multivariate data projection. IEEE Transactions on Neural Networks. vol. 6, No. 2, pp. 296-317, Mar. 1995, doi: 10.1109/72. 363467.
Matsubara, et al. Ising-Model Optimizer with Parallel-Trial Bit-Sieve Engine. Complex, Intelligent, and Software Intensive Systems: Proceedings of the 11th International Conference on Complex, Intelligent, and Software Intensive Systems (CISIS-2017), pp. 432-438, 2018.
McCaskey, et al. Hybrid Programming for Near-term Quantum Computing Systems. 2018 IEEE international conference on rebooting computing (ICRC). 2018. pp. 1-12.
Membrives, E.J. Machine-Learning for Optimization of Software Parameters. Technical Disclosure Commons. Defensive Publication Series. Dec. 7, 2017. pp. 1-35. https://www.tdcommons.org/dpubs_series/898.
Pardalos, P.M et al., The Maximum Clique Problem, Journal of Global Optimization 4:301-328 (1994).
PCT/IB2017/051224 International Search Report dated May 18, 2017.
PCT/IB2020/055801 International Search Report and Written Opinion dated Oct. 30, 2020.
PCT/IB2022/059253 International Search Report and Written Opinion dated Jan. 27, 2023.
PCT/IB2023/054723 International Search Report and Written Opinion dated Jul. 19, 2023.
Pedregosa, F. Hyperparameter optimization with approximate gradient. International conference on machine learning. PMLR, 2016.
Pillutla, et al. A Smoother Way to Train Structured Prediction Models. NIPS'18: Proceedings of the 32nd International Conference on Neural Information Processing Systems. Dec. 3, 2018. doi:10.48550/arxiv.1902.03228 Retrieved from the Internet: https://dl.acm.org/doi/pdf/10.5555/3327345.3327386.
Rappe, et al. UFF, a Full Periodic Table Force Field for Molecular Mechanics and Molecular Dynamics Simulations. J. Am. Chem. Soc. 1992, 114, 25, 10024-10035. https://doi.org/10.1021/ja00051a040.
Resende, et al. GRASP with path-relinking: Recent advances and applications. Metaheuristics: progress as real problem solvers (2005): 29-63.
Sakaguchi, et al. Boltzmann Sampling by Degenerate Optical Parametric Oscillator Network for Structure-Based Virtual Screening. Entropy. 2016; 18(10):365. https://doi.org/10.3390/e18100365.
Sarma, Abhijat, et al. Quantum Unsupervised and Supervised Learning on Superconducting Processors. ArXiv, 2019, /abs/1909.04226 (2019).
U.S. Appl. No. 16/671,767 Office Action dated Aug. 30, 2022.
U.S. Appl. No. 16/811,479 Office Action dated Feb. 14, 2023.
U.S. Appl. No. 16/888,419 Office Action dated Aug. 24, 2023.
U.S. Appl. No. 16/888,419 Office Action dated Feb. 3, 2023.
U.S. Appl. No. 17/110,729 Office Action dated May 9, 2023.
U.S. Appl. No. 17/110,729 Office Action dated Sep. 29, 2023.
U.S. Appl. No. 17/254,661 Office Action dated Mar. 22, 2023.
U.S. Appl. No. 17/254,661 Office Action dated Sep. 18, 2023.
U.S. Appl. No. 17/553,551 Notice of Allowance dated Dec. 1, 2023.
U.S. Appl. No. 17/553,551 Office Action dated Jul. 17, 2023.
U.S. Appl. No. 18/047,981 Corrected Notice of Allowance dated Aug. 18, 2023.
U.S. Appl. No. 18/047,981 Office Action dated Jan. 11, 2023.
Wah, et al. Simulated Annealing with Asymptotic Convergence for Nonlinear Constrained Global Optimization. Principles and Practice of Constraint Programming—CP'99: 5th International Conference, CP'99, Alexandria, VA, USA, Oct. 11-14, 1999. Proceedings 5. Springer Berlin Heidelberg, 1999.
Wikipedia. Automatic Differentiation. Article from Nov. 23, 2016. https://en.wikipedia.org/w/index.php?title=Automatic_differentiation &oldid=751071969. Accessed Jan. 29, 2023. (Year: 2016).
Zhu, et al. Training of quantum circuits on a hybrid quantum computer. Sci Adv. Oct. 2019; 5(10): eaaw9918. Published online Oct. 18, 2019. doi: 10.1126/sciadv.aaw9918.
Aggarwal et al.: Evolutionary network analysis: A survey. ACM Computing Surveys 47(1):10:1-10:36 (2014).
Aharonov, et al. Adiabatic quantum state generation and statistical zero knowledge. Proceedings of the thirty-fifth annual ACM symposium on Theory of computing. 2003. https://arxiv.org/abs/quant-ph/0301023.
Akama et al. Implementation of divide-and-conquer method including Hartree-Fock exchange interaction. J Comput Chem 28(12):2003-2012 (2007).
Alidaee et al. Solving the maximum edge weight clique problem via unconstrained quadratic programming. European Journal of Operational Research 181(2):592-597 (2007).
Amelio et al.: Community mining in signed networks: A multiobjective approach. ASONAM 2013: Proceedings of the 2013 IEEE/ACM International Conference on Advances in Social Networks Analysis and Mining, pp. 95-99 https://doi.org/10.1145/2492517.2492641 (2013).
Amin et al.: Quantum Boltzmann Machine. arXiv reprint arXiv: 1601.02036 [1-10] 2016.
An et al., "Quantum linear system solver based on time-optimal adiabatic quantum computing and quantum approximate optimization algorithm," 2019, arXiv preprint arXiv:1909.05500.
Anchuri et al.: Communities and balance in signed networks: A spectral approach. In Proceedings of the 2012 International Conference on Advances in Social Networks Analysis and Mining (ASONAM 2012), ASONAM 2012, pp. 235-242, Washington, DC, USA (2012).
Anthony et al. Quadratization of symmetric pseudo-Boolean functions. Discrete Appl. Math. 203:1-12 (2016).
Aspuru-Guzik et al. Simulated Quantum Computation of Molecular Energies. Science 309:1704 (2005).

(56) References Cited

OTHER PUBLICATIONS

Assad et al. The quadratic minimum spanning tree problem. Naval Research Logistics 39:399-417 (1992).
Babbush et al. Resource Efficient Gadgets for Compiling Adiabatic Quantum Optimization Problems. arXiv: 1307.8041v1 [quant-ph] (pp. 1-11) (Jul. 2013) Retrieved from the Internet: (https://arxiv.org/pdf/1307.8041.pdf5).
Babbush. Towards Viable Quantum Computation for Chemistry, 2015, [Retrieved on Feb. 27, 2020]. Retrieved from the internet: <url: https://pdfs.sennanticscholar.org/aff0/5ecf5f58c2206c923b767d76bed7f43b2a66.pdf? ga=2.2412147.276222377.1582743768639821531.1551220934 376 Pages (1376) (2015).
Barends et al. Digitized adiabatic quantum computing with a superconducting circuit. Nature 534(7606):222-226 (2016).
Bartak et al. Constraint Satisfaction Techniques for Planning and Scheduling Problems (Coplas-15), Jul. 6, 2015. Retrieved on Nov. 17, 2019 at https://www.cs.bgu.ac.il/-icapsl5/workshops/Proceedings%2000PLAS%202015.pdf (pp. 1-41) (2015).
Beasley. Integer programming solution methods. Available at URL: http://people.brunel.ac.uk/-mastjjb/jeb/natcor_ip_rest.pdf (20 pgs.) (2011).
Berry et al. Simulating Hamiltonian dynamics with a truncated Taylor series. Phys Rev Lett 114(9):090502 (2015).
Bertoni et al. Quantum logic gates based on coherent electron transport in quantum wires. Physical Review Letters 84(25):5912 (2000).
Bhagat et al.: Node Classification in Social Networks. arXiv:1101.3291v1 Social Network Data Analytics, pp. 115-148 (2011).
Bian et al. The Ising model: teaching an old problem new tricks. D-Wave Systems 2 (32 pgs.) (2010).
Bojchevski et al.: Deep Gaussian Embedding of Graphs: Unsupervised Inductive Learning via Ranking. arXiv.org, Cornell University, arXiv:1707.03815v4 [stat.ML], pp. 1-13 (2018).
Bombin, et al. Topological quantum distillation. Phys Rev Lett. Nov. 3, 2006;97(18):180501. doi: 10.1103/PhysRevLett.97.180501. Epub Oct. 30, 2006.
Boros et al. On quadratization of pseudo-Boolean functions. arXiv:1404.6538v1 [math.OC] (11 pgs.) (2014).
Boros et al. Pseudo-boolean optimization. Discrete Applied Mathematics 123(1):155-225 (2002).
Bravyi et al. Fermionic quantum computation. arXiv:quant-ph/0003137 (2000).
Bromley et al.: Applications of near-term photonic quantum computers: software and algorithms. Quantum Science and Technology 5:034010DOI:10.1088/2058-9565/ab8504 arXiv:1912.07634 [1-36] (2019).
Burell: An Introduction to Quantum Computing using Cavity QED concepts. arXiv preprint arXiv:1210.6512 (2012).
Byrnes et al. Macroscopic quantum computation using Bose-Einstein condensates. arXiv preprint quantum-ph/1103.5512 (2011).
Cai et al. A practical heuristic for finding graph minors.arXiv:1406.2741 [quant-ph] (16 pgs) (2014).
Cai et al.: A survey on network community detection based on evolutionary computation. International Journal of Bio-Inspired Computation 8(2):84-98 (2016).
Cao et al.: Advances in Knowledge Discovery and Data Mining. Springer International, pp. 82-95 (2015).
Carleo et al.: Constructing exact representations of quantum many-body systems with deep neural networks. Nat Commun. 9(1):5322, pp. 1-11 doi:10.1038/s41467-018-07520-3 (2018).
Carleo et al.: Solving the quantum many-body problem with artificial neural networks. pre-print arXiv:1606.02318 Science 355(6325):602-606 doi:10.1126/science.aag2302 (2016).
Carrasquilla et al.: Reconstructing quantum states with generative models. arXiv:1810.10584 Nature Machine Intelligence 1(3):155-161 arXiv:1810.10584 (2019).
Carrasquilla. Machine learning for quantum matter. https://arxiv.org/pdf/2003.11040.pdf (2020).

Chamberland et al, Triangular color codes on trivalent graphs with flag qubits. New J. Phys. Feb. 2020. vol. 22 023019. 24 pages. https://doi.org/10.1088/1367-2630/ab68fd.
Chen et al.: Community Detection via Maximization of Modularity and Its Variants. IEEE Transactions on Computational Social Systems 1(1):46-65 DOI:10.1109/TCSS.2014.2307458 (2014).
Chen et al.: Epidemic spreading on networks with overlapping community structure. Physica A: Statistical Mechanics and its Applications 391(4):1848-1854 (2012).
Chiang et al.: Exploiting longer cycles for link prediction in signed networks. In Proceedings of the 20th ACM International Conference on Information and Knowledge Management, CIKM 2011, pp. 1157-1162, New York, NY, USA [1-6] (2011).
Choi. Minor-embedding in adiabatic quantum computation: I. The parameter setting problem. Quantum Information Processing 7(5):193-209 (2008).
Chowdhury et al.: Quantum algorithms for Gibbs sampling and hitting-time estimation. arXiv:1603.02940 Quant. Inf. Comp. 17(1-2):41-64 (2017).
Chuang et al.: Experimental implementation of fast quantum searching. Physical Review Letters 80(15):3408-3411 DOI:10.1103/PhysRevLett.80.3408 (1998).
Clarke et al. Superconducting quantum bits. Nature 453(7198):1031 (2008).
Conforti et al.: Integer Programming: Graduate Texts in Mathematics 271. Springer [1-466] (2014).
Conway et al. An FPGA-based instrumentation platform for use at deep cryogenic temperatures. arxiv.org/abs/1509.06809 (2015).
Cory et al. Nuclear magnetic resonance spectroscopy: An experimentally accessible paradigm for quantum computing. arXiv preprint quant-ph/97090 01(1997).
Cowtan et al. On the qubit routing problem. arXiv:1902.08091v2 (2019).
Cramer et al. Efficient quantum state tomography, Nature Communications 1:149 (2010).
Das et al., A Scalable Decoder Micro-architecture for Fault-Tolerant Quantum Computing. arXiv preprint arXiv:2001.06598 (2020).
Debnath et al.: Demonstration of a small programmable quantum computer with atomic qubits. arXiv:1603.04512 Nature 536(7614):63-66 doi:10.1038/nature18648 (2016).
Delfosse et al, Almost-linear time decoding algorithm for topological codes. Quantum 5 (2021): 595.
Delfosse et al, Toward a Union-Find decoder for quantum LDPC codes. IEEE Transactions on Information Theory 68.5 (2022): 3187-3199.
Deutsch et al. Quantum computing with neutral atoms in an optical lattice. arXiv preprint quant-ph/0003022 Fortschritte der Physik Progress of Physics; Oct. 2000, vol. 48, No. 9-11, pp. 925-943 (2000).
Durr et al. A Quantum Algorithm for Finding the Minimum. arXiv:quant-ph/9607014 (1996).
Dwave, Reverse Quantum Annealing for Local Refinement of Solutions, D-Wave Whitepaper Series, Nov. 9, 2017. Retrieved online on Aug. 14, 2019 from https://www.dwavesys.com/sites/default/files/14-1018A-A_Reverse_Quantum_Annealing_for_Local_Refinement_Of_Solutions.pdf (2 pgs.).
Elvira et al.: Efficient Multiple Importance Sampling Estimators. pre-print arxiv.org/pdf/1505.05391, pp. 1-7 (2015).
EP17812349.3 Third Party Observations dated Oct. 29, 2020.
Esmailian et al.: Mesoscopic analysis of online social networks: The role of negative ties. arXiv:1411.6057v1 Phys. Rev. E90:042817, pp. 1-13 (2014).
Farhi et al. A Quantum Approximate Optimization Algorithm. arXiv:1411.4028 (2014).
Farhi, et al. Quantum Adiabatic Evolution Algorithms versus Simulated Annealing. arXiv.org:quant-ph/0201031 pp. 1-16 (2002).
Farhi et al. Quantum computation by adiabatic evolution. arXiv preprint quant-ph/0001106 (24 pgs) (2000).
Fedichkin et al. Novel coherent quantum bit using spatial quantization levels in semiconductor quantum dot. arXiv preprint quant-ph/0006097 (2000).

(56) References Cited

OTHER PUBLICATIONS

Fedorov et al. Exploring chemistry with the fragment molecular orbital method. Physical Chemistry Chemical Physics 14:7562-7577 (2012).
Ferrara et al.: Detecting criminal organizations in mobile phone networks. arXiv:1404.1295v1 Expert Systems with Applications 41(13):5733-5750 (2014).
Fortunato: Community detection in graphs. arXiv.org, Cornell University, arXiv:0906.0612v1 [physics.soc-ph], pp. 1-89 (2009).
Fowler, A.G. Minimum weight perfect matching in O (1) parallel time. arXiv 1307 (2013).
Freund. Applied Lagrange Duality for Constrained Optimization. Massachusetts Institute of Technology (pp. 1-35) (2004).
Gelman et al.: Simulating normalizing constants: from importance sampling to bridge sampling to path sampling. Statist. Sci. 13(2):163-185 DOI:10.1214/ss/1028905934 (1998).
Geoffrion. Lagrangean relaxation for integer programming. Mathematics Programming Study 2, North-Holland Publishing Company (pp. 1-34) (1974).
Gheorghiu, V. Standard form of qudit stabilizer groups. arXiv preprint arXiv:1101.1519 (2011).
Glover et al. Polynomial unconstrained binary optimisation Part 1, 2011, [Retrieved on Feb. 27, 2020]. Retrieved from the internet: <url: http://leedsfaculty.colorado.edu/glover/fred%20pubs/424%20%20%20Polynonnial 25 Pages (231256) (2011).
Glover et al.: Tabu Search: Modern Heuristic Techniques for Combinatorial Problems. Colin R. Reeves (Ed.) Black Scientific Publications, Oxford [1-62] (1993).
Glover: Tabu search—part II. ORSA Journal on computing 2(1):4-32.1 4-32 DOI:10.1287/ijoc.2.1.4 (1990).
Gottesman, D. An Introduction to Quantum Error Correction and Fault-Tolerant Quantum Computation. arXiv preprint arXiv:0904.2557 (2009).
Greene et al. Simulated annealing without rejected moves. IEEE Transactions on Computer-Aided Design of Integrated Circuits and Systems 5(1):221-228 (1986).
Grover. A fast quantum mechanical algorithm for database search. Proceedings of the 28th Annual ACM Symposium on the Theory of Computing (pp. 212-219) (1996).
Gwennap: Groq Rocks Neural Networks. The Linley Group Microprocessor Report www.groq.com/groq-tsp-leads-in-inference-performance/ [1-5] (2020).
Hamilton et al.: Representation Learning on Graphs: Methods and Applications. arXiv.org, Cornell University, arXiv:1709.05584v3 [cs.SI], pp. 1-24 (2018).
Harneit. Spin Quantum Computing with Endohedral Fullerenes. arXiv preprint arXiv:1708.092 98 (2017).
He et al.: MISAGA: An Algorithm for Mining Interesting Subgraphs in Attributed Graphs. IEEE Transactions on Cybernetics 48(5):1369-1382 (2018).
Heider: Attitudes and cognitive organization. The Journal of Psychology 21(1):107-112 (1946).
Hennessy, et al. Computer Architecture: A Quantitative Approach. Elsevier Science & Technology, 2014. ProQuest Ebook Central, https://ebookcentral.proquest.com/lib/USPTO-ebooks/detail.action?docID=404052. (Year: 2014).
Huang et al, Fault-tolerant weighted union-find decoding on the toric code. Physical Review A 102.1 (2020): 012419.
Huang et al.: Predicting many properties of a quantum system from very few measurements. Nature Physics 16(10)1050-1057 doi:arxiv.org/abs/2002.08953 [1-40](2020).
Hukushima et al. Exchange Monte Carlo Method and Application to Spin Glass Simulations. Journal of the Physical Society of Japan 65:1604 (1996).
Humble et al.: Software Systems for High-performance Quantum Computing. IEEE Xplore doi:10.1109/HPEC.2016.7761628 [1-8](2016).
Ishikawa. Transformation of General Binary MRF Minimization to the First-Order Case. IEEE Transactions on Pattern Analysis and Machine Intelligence. 33(6):1234-1249 (2011).

Izmaylov et al.: Revising the measurement process in the variational quantum eigensolver: is it possible to reduce the number of separately measured operators? Chem Sci. 10(13):3746-3755 (2019).
Jiang, et al. Simulated annealing based influence maximization in social networks. Twenty-fifth AAAI conference on artificial intelligence (AAAI'11). AAAI Press, 127-132. (Year: 2011).
Johnson et al. Quantum annealing with manufactured spins. Nature 473(7346):194-198 (2011).
Jones et al.: Implementation of a quantum algorithm to solve Deutsch's problem on a nuclear magnetic resonance quantum computer. arXiv:quant-ph/9801027v2 The Journal of chemical physics, 109(5):1648-1653 DOI:10.1063/1.476739 (1998).
Jordan. Fast Quantum Algorithm for Numerical Gradient Estimation. Physical Review Letters 95:050501 (2015).
Kaminsky et al.: Scalable architecture for adiabatic quantum computing of NP-hard problems. Quantum Computing & Quantum Bits in Mesoscopic Systems, pp. 229-236 DOI:10.1007/978-1-4419-9092-1_25 [arXiv:quant-ph/0211152 1-10] (2004).
Kane. A silicon-based nuclear spin quantum computer. Nature 393(6681):133 (1998).
Karimi et al. A subgradient approach for constrained binary programming via quantum adiabatic evolution. arXiv preprint arXiv:1605.09462 (16 pgs.) (2016).
Karimi et al. Boosting quantum annealer performance via quantum persistence. Online publication eprint arXiv:1606.07797 (6/27/ 27 and updated Aug. 30, 2016). Accessed May 17, 2017 and available from https://www.arxiv.org/pdf/1606.07797.pdf (25 pgs).
Karimi, et al. Practical integer-to-binary mapping for quantum annealers. Quantum Information Processing, vol. 18, No. 4, 94 (2019) DOI: 10.1007/s11128-019-2213-x.
Kassal et al.: Simulating chemistry using quantum computers. Annu Rev Phys Chem. 62:185-207 (2011).
Katzgraber et al. Seeking quantum speedup through spin glasses: the good, the bad, and the ugly. Physical Review 5(3):031026 (2015).
Kellerer et al. Knapsack Problems. Springer (15 pgs.) (2004).
Kempe et al.: The Complexity of the Local Hamiltonian Problem. SIAM Journal of Computing. 35(5):1070-1097 Rev.2008 DOI: arXiv:quant-ph/0406180v2 [1-30] (2005).
Kielpinski et al. Architecture for a large-scale ion-trap quantum computer. Nature 417(6890):709 (2002).
Kirkpatrick et al. Optimization by simulated annealing. Science 220:671-680 (1983).
Kitaura et al. Fragment molecular orbital method: an approximate computational method for large molecules. Chemical Physics Letters 313(3-4):701-706 (1999).
Knill et al. Efficient linear optics quantum computation. arXiv preprint quant-ph/0006088 (2000).
Knill, et al. Resilient Quantum Computation: Error Models and Thresholds. Proceedings of the Royal Society of London. Series A: Mathematical, Physical and Engineering Sciences 454.1969 (1998): 365-384.
Knizia et al. Density Matrix Embedding: A Simple Alternative to Dynamical Mean-Field Theory. Phys Rev Lett 109:186404 (2012).
Kobayashi et al. Chapter 5: Divide-and-conquer approaches to quantum chemistry: Theory and implementation, in Linear-Scaling Techniques in Computational Chemistry and Physics: Methods and Applications, edited by Zalesny et al. (Springer Netherlands, Dordrecht, 2011) pp. 97-127.
Kochenberger et al.: The unconstrained binary quadratic programming problem: A survey. J Comb Optim. 28(1)58-81 DOI:10.1007/s10878-014-9734-0 (2014).
Kokail et al. Self-verifying variational quantum simulation of lattice models. Nature 569(7756):355-360 (2019).
Konda et al. Actor-Critic Algorithms. Advances in Neural Information Processing Systems. pp. 1008-1014 (2000).
Kubica et al, Efficient color code decoders in d = 2 dimensions from toric code decoders. arXiv preprint arXiv:1905.07393 (2019).
Kunegis et al.: The slashdot zoo: Mining a social network with negative edges. In Proceedings of the 18th International 20 Conference on World Wide Web, WWW 2009, pp. 741-750, New York, NY, USA DOI:10.1145/1526709.1526809 (2009).

(56) References Cited

OTHER PUBLICATIONS

Lemieux et al.: Efficient Quantum Walk Circuits for Metropolis-Hastings Algorithm. Quantum 4:287 [1-15] (2020).

Lemieux et al.: Resource estimate for quantum many-body ground-state preparation on a quantum computer. Physical Review A 103(5)052408 DOI:10.1103/PhysRevA.103.052408 [1-9] (2021).

Lenstra: Integer programming with a fixed number of variables. 8(4):538-548 URL: https://doi.org/10.1287/moor.8.4.538 (1983).

Leskovec et al.: Empirical Comparison of Algorithms for Network Community Detection. Proceedings of International World Wide Web Conference 2010, Raleigh, North Carolina, USA, pp. 1-10 (2010).

Leskovec et al.: Predicting positive and negative links in online social networks. In Proceedings of the 19th International Conference on World Wide Web, WWW 2010, pp. 1-10, New York, NY, USA (2010).

Leuenberger et al. Quantum computing in molecular magnets. arXiv preprint cond-mat/0011415 (2001).

Levit et al. Free energy-based reinforcement learning using a quantum processor. Available at https://arxiv.org/pdf/1706.00074.pdf (May 2017) (8 pgs.).

Leyffer. Deterministic Methods for Mixed Integer Nonlinear Programming. University of Dundee (pp. 1-60 and pp. 1-58) (1993).

Li et al. Nonlinear Integer Programming. New York, NY (pp. 1-452) (2006).

Li: Tackling the Qubit Mapping Problem for NISQ-Era Quantum Devices. arXiv:1809.02573v2 Proceedings of the Twenty-Fourth International Conference on Architectural Support for Programming Languages and Operating Systems. (2019).

Liben-Nowell et al.: The link prediction problem for social networks. In Proceedings of the Twelfth International Conference on Information and Knowledge Management, CIKM 2003, pp. 556-559, New York, NY, USA [1-19](2004).

Lin et al.: Understanding community effects on information diffusion. Advances in Knowledge Discovery and Data Mining, pp. 82-95 DOI:10.1007/978-3-319-18038-0_7 (2015).

Low et al.: Hamiltonian simulation by Qubitization. arXiv: 1610.06546v3 Quantum 3:163 URL:https://doi.org/10.22331/q-2019-07-12-163 [1-23] (2019).

Lu et al.: Demonstration of Shor's quantum factoring algorithm using photonic qubits. arXiv:0705.1684v3 Physical Review Letters 99(25):250504 DOI:10.1103/PhysRevLett.99.250504 [1-5] (2007).

Lu et al.: KKT Solution and Conic Relaxation for Solving Quadratically Constrained Quadratic Programming Problem. SIAM J. Optim. 21(4):1475-1490 DOI:10.1137/100793955 (2011).

Lu et al., Quantum chemistry simulation on quantum computers: theories and experiments. Physical Chemistry Chemical Physics 14(26):9411-9420 (2012).

Lyon. Spin-based quantum computing using electrons on liquid helium. arXiv preprint cond-mat/030158 1 (2006).

Martinis et al. Rabi oscillations in a large Josephson-junction qubit. Physical Review Letters 89:117901 (2002).

Marx et al. Chapter 1. Setting the stage: why ab initio molecular dynamics? In Ab Initio Molecular Dynamics: Basic Theory and Advanced Methods. Cambridge, UK Cambridge University Press (pp. 1-8) (2009).

Massa et al.: Controversial users demand local trust metrics: An experimental study on Epinions.com community. In Proceedings of the 20th National Conference on Artificial Intelligence AAA Press vol. 1, AAAI-05:121-126 (2005).

Matsuura et al. VanQver: The Variational and Adiabatically Navigated Quantum Eigensolver. New Journal of Physics 22:053023 (2020).

McClean et al. The Theory Of Variational Hybrid Quantum-Classical Algorithms, Institute of Physics. New Journal of Physics 18:023023. Retrieved online on Aug. 14, 2019 from https://iopscience.iop.org/article/10.1088/1367-2630/18/2/023023/ampdf (21 pgs) (2016).

McGeoch et al. Experimental Evaluation of an Adiabatic Quantum System for Combinatorial Optimization. Computing Frontiers. Proceeding CF '13 Proceedings of the ACM International Conference on Computing Frontiers. Article No. 23. Available at http://www.cs.amherst.edu/ccm/cf14-mcgeoch.pdf (11 pgs) (May 14-16, 2013).

McKiernan et al. Automated quantum programming via reinforcement learning for combinatorial optimization. Quantum Physics. arXiv.org quant-ph arXiv:1908.08054 (2019).

Medus et al.: Detection of community structures in networks via global optimization. Physica A: Statistical Mechanics and its Applications 358(2-4):593-604 DOI:10.1016/j.physa.2005.04.022 (2005).

Melko et al.: Restricted Boltzmann machines in quantum physics. Nature Physics 15(9):887-892 DOI:10.1038/s41567-019-0545-1 (2019).

Metz. IBM Is Now Letting Anyone Play With Its Quantum Computer. WIRED. (5 pgs.) (May 2016).

Mnih et al. Asynchronous Methods for Deep Reinforcement Learning, in International Conference on Machine Learning, pp. 1928-1937 (2016).

Mnih et al. Playing Atari with Deep Reinforcement Learning. arXiv:1312.5602 (2013).

Moll et al., Optimizing qubit resources for quantum chemistry simulations in second quantization on quantum computer. Journal of Physics A: Mathematical and Theoretical 49(29):295301 (2016).

Moll et al.: Quantum optimization using variational algorithms on near-term quantum devices. Quantum Sci. Technol. 3 030503 [1-17] (2018).

Montanaro. Quantum walk speedup of backtracking algorithms. arXiv:1509.02374v2 [quant-ph] (23 pgs) (2015).

Monz et al.: Realization of a scalable Shor algorithm. arXiv:1507.08852 Science 351(6277):1068-1070 DOI:10.1126/science.aad9480 (2015).

Motzkin et al.: Maxima for graphs as a new proof of a theorem of Turan. Canadian Journal of Mathematics 17:533-540 DOI:10.4153/CJM-1965-053-6 (1965).

Nafradi et al. Room temperature manipulation of long lifetime spins in metallic-like carbon nanospheres. Nat Commun 7:12232 (2016).

Nagy et al.: Variational quantum Monte Carlo method with a neural-network ansatz for open quantum systems. Phys Rev Letters 122(25):250501 doi:arxiv.org/abs/1902.09483 [1-10](2019).

Nam et al.: Ground-state energy estimation of the water molecule on a trapped ion quantum computer. arXiv preprint arXiv:1902.10171, pp. 1-14 (2019).

Newman et al.: Finding and evaluating community structure in networks. Phys. Rev. E. 69:026113, pp. 1-16 (2004).

Newman: Modularity and community structure in networks. PNAS 103(23):8577-8582 (2006).

Nielsen, et al. Quantum Computation and Quantum Information. Chapter 10: Quantum error-correction. Cambridge University Press. pp. 425-499. (2010).

Niklasson et al., Fast method for quantum mechanical molecular dynamics. Physical Review B 86(17):174308 (2012).

Nishikawa et al. Quantum Chemistry Grid/Gaussian Portal, Journal of the twenty second Annual Research Society, Japan Simulation Society, Jun. 18, 2003, pp. 369 to 372 (English Abstract).

Nizovtsev et al. A quantum computer based on NV centers in diamond: optically detected nutations of single electron and nuclear spins. Optics and spectroscopy 99(2):233-244 (2005).

O'Gorman et al. Compiling planning into quantum optimization problems: a comparative study. Proc. of the Workshop on Constraint Satisfaction Techniques for Planning and Scheduling Problems (COPLAS-15) (pp. 11-20) (Jun. 2015) Retrieved from the Internet: <https://www.cs.bgu.acilt--icaps15/workshops/Proceedings%2000PLAS%202015.pdf>.

Ohlsson et al. Quantum computer hardware based on rare-earth-ion-doped inorganic crystals. Optics Communications 201(1-3):71-77 (2002).

Olsson et al.: Solving Large Scale Binary Quadratic Problems: Spectral Methods vs. Semidefinite Programming. IEEE Conference on Computer Vision and Pattern Recognition, pp. 1-8, doi:10.1109/CVPR.2007.383202 (2007).

O'Malley et al. Scalable Quantum Simulation of Molecular Energies. Phys. Rev. X 6:031007 (2016).

ORUS. Tensor networks for complex quantum systems. Nature Reviews Physics 1:538 (2019).

(56) References Cited

OTHER PUBLICATIONS

Papamakarios: Comparison of Modern Stochastic Optimization Algorithms. Scholar article. [1-13] (2014) www.richtarik.org/papers/Papamakarios.pdf.
Parekh, et al. Benchmarking adiabatic quantum optimization for complex network analysis. arXiv preprint arXiv: 1604.00319 (2016). (Year: 2016).
PCT/CA2017/050320 International Search Report and Written Opinion dated Jun. 27, 2017.
PCT/CA2017/050637 International Search Report and Written Opinion dated Aug. 25, 2017.
PCT/CA2017/050709 International Search Report and Written Opinion dated Sep. 19, 2017.
PCT/CA2017/051610 International Search Report and Written Opinion dated Mar. 21, 2018.
PCT/CA2018/051531 International Search Report and Written Opinion dated Feb. 20, 2019.
PCT/CA2018/051534 International Search Report and Written Opinion dated Feb. 21, 2019.
PCT/CA2019/050852 International Search Report and Written Opinion dated Aug. 15, 2019.
PCT/CA2019/051752 International Search Report and Written Opinion dated Mar. 17, 2020.
PCT/CA2020/050641 International Search Report and Written Opinion dated Jul. 21, 2020.
PCT/CA2021/050513 International Search Report and Written Opinion dated Jul. 14, 2021.
PCT/CA2021/050709 International Search Report and Written Opinion dated Aug. 3, 2021.
PCT/CA2021/050750 International Search Report and Written Opinion dated Aug. 6, 2021.
PCT/IB2017/051038 International Search Report dated May 16, 2017.
PCT/IB2019/055226 International Search Report and Written Opinion dated Nov. 26, 2019.
PCT/IB2020/061464 International Search Report and Written Opinion dated Mar. 4, 2021.
PCT/IB2021/051965 International Search Report and Written Opinion dated May 31, 2021.
PCT/IB2021/059421 International Search Report and Written Opinion dated Dec. 20, 2021.
PCT/IB2021/061527 International Search Report and Written Opinion dated Apr. 8, 2022.
PCT/IB2022/053658 International Search Report and Written Opinion dated Jun. 27, 2022.
PCT/IB2022/056124 International Search Report and Written Opinion dated Sep. 16, 2022.
Pedram, et al. Layout Optimization for Quantum Circuits with Linear Nearest Neighbor Architectures. IEEE Circuits and Systems Magazine 16 (2016): 62-74.
Peruzzo et al. A variational eigenvalue solver on a quantum processor. arXiv:1304.3061 (2013).
Pizzuti: A multi-objective genetic algorithm for community detection in networks. IEEE International Conference on Tools with Artificial Intelligence, pp. 379-386 DOI:10.1109/ICTAI.2009.58 (2009).
Poulin et al.: Sampling from the thermal quantum Gibbs state and evaluating partition functions with a quantum computer. arXiv:0905.2199 Physical Review Letters 103(22), pp. 1-7 DOI:10.1103/PhysRevLett.103.220502 (2009).
Preskill. Quantum Computing in the NISQ era and beyond. Quantum 2:79 arXiv:1801.00862 (2018).
Quek et al.: Adaptive Quantum State Tomography with Neural Networks. arXiv.org, Cornell University, arXiv:1812.06693v1 [quant-ph], pp. 1-13 pages (2018).
Reiher et al.: Elucidating reaction mechanisms on quantum computers. PNAS USA 114(29):7555-7560 (2017).
Ronagh et al. Solving constrained quadratic binary problems via quantum adiabatic evolution. arXiv preprint arXiv:1509.05001 (20 pgs.) (2015).
Rosenberg et al. Building an iterative heuristic solver for a quantum annealer. Computational Optimization and Applications 65:845 (2016).
Rubin: A Hybrid Classical/Quantum Approach for Large-Scale Studies of Quantum Systems with Density Matrix Embedding Theory. Cornell University Library, Ithaca, NY arXiv doi:arxiv.org/abs/1610.06910 [1-10](2016).
Salathe et al.: Dynamics and control of diseases in networks with community structure. PLOS Computational Biology 6(4):e1000736, pp. 1-11 (2010).
Schmidt et al. General Atomic and Molecular Electronic Structure System. Journal of Computational Chemistry 14:1347-1363 (1993).
Schollwock. The density-matrix renormalization group. Review of Modern Physics 77:259 arxiv.org:cond-mat/0409292 (2004).
Schuld et al., "Quantum machine learning in feature Hilbert spaces", Phys. Rev. Lett.; Feb. 1, 2019, vol. 122, pp. 040504-1-12.
Schulman et al. Proximal Policy Optimization Algorithms. arXiv:1707.06347 (2017).
Schwabl: Quantum Mechanics. Springer, 4th Ed. [1-425] (2007).
Sefi, et al. How to decompose arbitrary continuous-variable quantum operations. Physical review letters 107.17 (2011): 170501.
Sepehry, et al. Smooth Structured Prediction Using Quantum and Classical Gibbs Samplers. Oct. 1, 2018 (Oct. 1, 2018) Retrieved from the Internet: URL: https://arxiv.org/pdf/1809.04091v2.pdf [retrieved on Sep. 5, 2022].
Sepehry et al. Smooth Structured Prediction Using Quantum and Classical Gibbs Samplers. Available at https://1qbit.com/wp-content/uploads/2018/09/1QBit-Research-Paper-Smooth_Structured-Prediction-Using-Quantum-And_classical-Giobbs-Samplers.pdf (Accessed Feb. 20, 2018) (32 pgs).
Shapiro et al. A survey of Lagrangean techniques for discrete optimization. Operations Research Center, Massachusetts Institute of Technology, Cambridge, Massachusetts (pp. 1-18 and pp. 1-29) (May 1977).
Shen et al.: Quantum implementation of the unitary coupled cluster for simulating molecular electronic structure. Phys. Rev. A 95, 020501(R) doi:10.1103/PhysRevA.95.020501 [1-6] (2017).
Siraichi et al. Qubit Allocation. CGO 2018—International Symposium on Code Generation and Optimization, Feb. 2018, Vienna, Austria (12 pgs) (2018). pp. 1-12.
Sloss et al. Evolutionary Algorithms Review, arXiv:1906.08870 (2019).
Srinivas et al.: Muiltiobjective optimization using non-dominated sorting in genetic algorithms. Evolutionary Computation 2(3):221-248 (1994).
Sun et al. A single-photon switch and transistor enabled by a solid-state quantum memory. arXiv preprint quant-ph/1805.01964 (2018).
Suzuki. Fractal decomposition of exponential operators with applications to many-body theories and Monte Carlo simulations. Physics Letters A 146(6):319-323 (1990).
Svore et al. Toward a Software Architecture for Quantum Computing Design Tools. QPL 2004, pp. 127-144, Retrieved from the Internet: URL: https://www.microsoft.com/en-us/research/wp-content/uploads/2016/02/10Svore-Cros s-Aho-Chuang-Markov.pdf.
SymPy Python. Internals of the Polynomial Manupulation Module. Available online at http://docs.sympy.org/latest/modules/polys/internals.html (Accessed Jun. 2016) (136 pgs).
Tang et al.: A Survey of Signed Network Mining in Social Media. ACM Computing Surveys 9(4):pp. 39:1 to 39:38, arXiv.org, Cornell University, arXiv:1511.07569v3 [cs.SI] (2016).
Tavares et al. New algorithms for Quadratic Unconstrained Binary Optimization (QUBO) with applications in engineering and social sciences. Rutgers University Community Repository. Dissertation— Retrieved from the Internet <URL: https://rucorelibrariessutgers.edu/rutgers-lib/25771/> on Feb. 2, 2018 (460 pgs) ( May 2008).
Temme et al.: Quantum metropolis sampling. Nature 471(7336):87-90 (2011).
Terhal et al.: The problem of equilibration and the computation of correlation functions on a quantum computer. arXiv:quant-ph/9810063 Phys.Rev. A61:22301, pp. 1-35 DOI:10.1103/PhysRevA.61.022301 (2000).

(56) References Cited

OTHER PUBLICATIONS

The D-Wave 2X™ Quantum Computer Technology Overview (12 pgs) (2015).
The D-Wave Quantum Computer. Brochure. D-Wave Systems Inc. 2016. www.dwavesys.com.
Torlai et al.: Neural-network quantum state tomography. pre-print arXiv:1703.05334v2 Nature Physics 14:447-450 DOI:10.1038/s41567-018-0048-5 (2017).
Tran et al. A hybrid quantum-classical approach to solving scheduling problems. AAAI Publications, Ninth Annual Symposium on Combinatorial Search. pp. 98-106 (SoCS 2016).
Tran et al. Explorations of Quantum-Classical Approaches to Scheduling a MarsLander Activity Problem. The Workshops of the Thirtieth AAAI Conference on Artificial Intelligence Planning for Hybrid Systems: Technical Report WS-16-12, p. 641-649, published on Mar. 29, 2016.
Trotter. On the product of semi-groups of operators. Proceedings of the American Mathematical Society 10(4):545-551 (1959).
U.S. Appl. No. 16/811,479 Non-Final Office Action dated Aug. 30, 2021.
U.S. Appl. No. 15/014,576 Office Action dated Dec. 26, 2017.
U.S. Appl. No. 15/014,576 Office Action dated Jul. 10, 2017.
U.S. Appl. No. 15/051,271 Office Action dated Mar. 13, 2018.
U.S. Appl. No. 15/051,271 Office Action dated Nov. 24, 2017.
U.S. Appl. No. 15/165,655 1st Action Interview dated Feb. 24, 2017.
U.S. Appl. No. 15/165,655 1st Action Interview dated Oct. 25, 2016.
U.S. Appl. No. 15/165,655 Office Action dated Jun. 2, 2017.
U.S. Appl. No. 15/486,960 Office Action dated Jun. 22, 2017.
U.S. Appl. No. 15/830,953 Office Action dated Feb. 14, 2018.
U.S. Appl. No. 15/831,967 Office Action dated Feb. 27, 2018.
U.S. Appl. No. 15/900,643 Miscellaneous Communication re: Third Party Submission dated Dec. 14, 2018.
U.S. Appl. No. 15/900,643 Office Action dated Apr. 14, 2022.
U.S. Appl. No. 16/010,244 Miscellaneous Communication re: Third Party Submission dated Apr. 23, 2019.
U.S. Appl. No. 16/010,244 Office Action dated Dec. 2, 2019.
U.S. Appl. No. 16/010,244 Office Action dated Jun. 10, 2019.
U.S. Appl. No. 16/124,083 Miscellaneous Communication re: Third Party Submission dated Jul. 11, 2019.
U.S. Appl. No. 16/124,083 Office Action dated Jul. 18, 2019.
U.S. Appl. No. 16/124,083 Office Action dated Nov. 21, 2019.
U.S. Appl. No. 16/162,249 Miscellaneous Communication re: Third Party Submission dated May 2, 2019.
U.S. Appl. No. 16/162,249 Office Action dated Dec. 2, 2019.
U.S. Appl. No. 16/162,249 Office Action dated Jun. 12, 2019.
U.S. Appl. No. 16/811,479 Office Action dated Apr. 8, 2022.
U.S. Appl. No. 16/811,479 Office Action dated Sep. 22, 2022.
U.S. Appl. No. 16/888,446 3rd Party Submission dated Apr. 7, 2021.
U.S. Appl. No. 17/254,661 Office Action dated Mar. 18, 2022.
U.S. Appl. No. 17/254,661 Office Action dated Sep. 14, 2022.

Ushijima-Mwesigwa, et al. Graph Partitioning using Quantum Annealing on the D-Wave System. Proceedings of the Second International Workshop on Post Moores Era Supercomputing. 2017. (Year: 2017).
Van Dam et al. How powerful is adiabatic quantum computation Proceedings 42nd IEEE Symposium on Foundations of Computer Science (pp. 279-287) (Oct. 2001).
Vartiainen: Unitary Transformations for Quantum Computing. Doctoral Dissertation. Helsinki University of Technology TKK dissertations. DOI: aaltodoc.aalto.fi/handle/123456789/2551 [1-56] (2005).
Veis et al.: Quantum computing applied to calculations of molecular energies: CH2 benchmark. J Chem Phys. 133(19):194106 doi: 10.1063/1.3503767 [1-29](2010).
Venuti et al.: Adiabaticity in open quantum systems. arXiv: 1508.05558v2 Phys. Rev. A93(3):032118, pp. 1-12 DOI:10.1103/PhysRevA.93.032118 (2016).
Vinci et al. Quantum annealing correction with minor embedding. Physical Review A 92.4 (34 pgs) (Jul. 2015).
Wang et al. Population Annealing: Theory and Application in Spin Glasses. Physics Review E 92:961 (2015).
Waskiewicz: Friend of a friend influence in terrorist social networks. In Proceedings on the International Conference on Artificial Intelligence (ICAO, pp. 1-5. The Steering Committee of The World Congress in Computer Science, Computer Engineering and Applied Computing (WorldComp) (2012).
Wendin: Quantum information processing with superconducting circuits: a review. Rep Prog Phys. 80(10):106001 doi:10.1088/1361-6633/aa7e1a [1-50](2017).
White. Density Matrix Formulation for Quantum Renormalization Groups. Physical Review Letters 69:286 (1992).
Whitfield et al., Simulation of electronic structure Hamiltonians using quantum computers. Molecular Physics 109(5):735-750 (2011).
Wigner et al. Paulische equivalence ban. Magazine for physics 47:631 (1928) (English Abstract).
Wooters et al. The no-cloning theorem. Physics Today 62(2):76-77 (2009).
Wouters et al. A Practical Guide to Density Matrix Embedding Theory in Quantum Chemistry. J Chem Theory Comput. 12(6):2706-19 (2016).
Xu et al.: Neural network state estimation for full quantum state tomography. ArXiv preprint doi:arxiv.org/abs/1811.06654 [1-8] (2018).
Yanagimoto, et al. Engineering a Kerr-based Deterministic Cubic Phase Gate via Gaussian Operations. Physical Review Letters 124.24 (2020): 240503.
Yang. Direct calculation of electron density in density-functional theory: Implementation for benzene and a tetrapeptide, Physical Review A 44:(11):7823-7826 (1991).
Zahedinejad et al.: Multi-Community Detection in Signed Graphs Using Quantum Hardware. arXiv.org, 1QBit online research paper, Cornell University, arXiv:1901.04873v1 [quant-ph], pp. 1-10 (2019).
Zimmerman et al. Strong Correlation in Incremental Full Configuration Interaction. Journal of Chemical Physics 146:224104 (2017).
Zulehner et al. Efficient mapping of quantum circuits to the IBM QX architectures. In Design, Automation & Test in Europe Conference & Exhibition 2018 38(7):1226-1236 (2018).

\* cited by examiner

METHOD AND SYSTEM FOR SOLVING THE LAGRANGIAN DUAL OF A CONSTRAINED BINARY QUADRATIC PROGRAMMING PROBLEM USING A QUANTUM ANNEALER

CROSS-REFERENCE

The present patent application is a continuation of U.S. patent application Ser. No. 16/809,473, filed Mar. 4, 2020, which is a continuation of U.S. patent application Ser. No. 15/014,576, filed Feb. 3, 2016, which claims the benefit of Canadian Patent Application No. 2,881,033, filed on Feb. 3, 2015, each of which is incorporated herein by reference in their entireties.

FIELD

The invention relates to computing. More precisely, this invention pertains to a method and system for solving the Lagrangian dual problem corresponding to a binary quadratic programming problem.

BACKGROUND

Duality is an important phenomenon in optimization theory. In general, duality is a process of generating a "dual" problem for the original "primal" problem. Solving dual problems provide information about the primal problem.

In some optimization models, duality directly yields alternative viewpoints to the problems. For example, in models of electrical networks, the "primal variables" may represent current flows, whereas the "dual variables" may represent voltage differences. In models of economic markets, "primal variables" may represent production and consumption levels and the "dual variables" may represent prices of goods and service. (See "Applied Lagrange Duality for Constrained Optimization" by Robert M. Freund, 2004, Massachusetts Institute of Technology).

In a wider range of scenarios, dual problems may yield more complicated information about the optimization model. For example, a good dual solution can be used to bound the values of the primal solutions. Using such information may be less trivial however very beneficial to solving optimization problems. For example, the solution to a dual problem can be used to prove optimality of a primal solution. In yet more complicated applications, solving a series of dual sub-problems can be used in iterative fashion to solve a more complicated original primal problem. Examples of such iterative applications of duality include branch and bound methods, cut and bound methods, and decomposition methods for solving integer and mixed-integer optimization problems. (see "Nonlinear Integer Programming" by Duan Li and Xiaoling Sun) (See "Deterministic Methods for Mixed Integer Nonlinear Programming" by Sven Leyffer, PhD Thesis, 1993, University of Dundee). In duality theory, several different types of dualization and dual problems are proposed. One type of dual problems are the Lagrangian dual problems. A thorough description of Lagrangian duality theory is disclosed in "Nonlinear integer programming" by Duan Li and Xiaoling Sun. Lagrangian dual problems can be used to solve many integer programming problems such as non-linear knapsack problems (see "Knapsack Problems" by Hans Kellerer, Ultich Pferschy and David Pisinger), non-linear minimum spanning tree problems (see "The quadratic minimum spanning tree problem" by Arjang Assad and Weixuan Xu), etc. These combinatorial optimization problems are models of many problems of interest in operational research; e.g. scheduling problems, job-shop problems, and resource allocation problems. For applications of Lagrangian techniques in discrete optimization refer to "A survey of Lagrangean techniques for discrete optimization" by Jeremy F. Shapiro, Operations Research Center, Massachusetts Institute of Technology, Cambridge, Mass. and to "Lagrangean relaxation for integer programming" by A. M. Geoffrion, Mathematics Programming Study 2 (1974) 82-114, North-Holland Publishing Company.

There are several methods proposed for solving the Lagrangian dual problems, e.g. subgradient method, outer Lagrangian linearization method, and bundle method. (see Chapter 3 of "Nonlinear integer programming" by Duan Li and Xiaoling Sun). The difficulty of having efficient implementations of such algorithms is the urge to very efficient methods for solving hard nonlinear integer programming problems in various stages of these methods. For example, the single constrained quadratic 0-1 knapsack problem can be solved using an efficient branch and bound method based on Lagrangian duality as explained in Section 11.5, "Nonlinear integer programming" by Duan Li and Xiaoling Sun but the proposed method cannot be generalized for multi-dimensional knapsack problems.

There is therefore a need for a method for solving the Lagrangian dual optimization problems that will overcome the above-identified drawback.

Features of the invention will be apparent from review of the disclosure, drawings and description of the invention below.

BRIEF SUMMARY

According to a broad aspect, there is disclosed a method for solving the Lagrangian dual of a constrained binary quadratic programming problem, the method comprising use of a processor for obtaining a constrained quadratic binary programming problem; until a convergence is detected, use of a processor for iteratively performing a Lagrangian relaxation of the constrained quadratic binary programming problem to provide an unconstrained quadratic binary programming problem; providing the unconstrained quadratic binary programming problem to a quantum annealer; obtaining from the quantum annealer at least one corresponding solution; using the at least one corresponding solution to generate a new approximation for a Lagrangian dual bound and use of a processor for providing a corresponding solution to the Lagrangian dual of the constrained binary quadratic programming problem after the convergence.

In accordance with an embodiment, the use of a processor for obtaining of a constrained quadratic binary programming problem comprises use of a processor for obtaining data representative of an objective function f(x) having a degree less than or equal to two; use of a processor for obtaining data representative of equality constraints having a degree less than or equal to two; and use of a processor for obtaining data representative of inequality constraints having a degree less than or equal to two.

In accordance with an embodiment, the use of a processor for obtaining the constrained quadratic binary programming problem comprises use of a processor for obtaining the constrained quadratic binary programming problem from at least one of a user, a computer, a software package and an intelligent agent.

In accordance with an embodiment, the use of a processor for obtaining of the constrained quadratic binary programming problem further comprises use of a processor for initializing software parameters and use of a processor for initializing a linear programming procedure.

In accordance with an embodiment, the software parameters are obtained by the processor from at least one of a user, a computer, a software package and an intelligent agent.

In accordance with an embodiment, the use of a processor for initializing of the software parameters comprises use of a processor for providing an embedding of the constrained quadratic binary programming problem on the quantum annealer; use of a processor for providing an embedding solver function for providing a list of solutions; use of a processor for providing one of lower and upper bounds and default values for Lagrange multipliers; use of a processor for providing one of initial values and default values for Lagrange multipliers; and use of a processor for providing an error tolerance value for duality gap.

In accordance with an embodiment, the linear programming procedure is carried out until the convergence is detected.

In accordance with an embodiment, the using of the at least one corresponding solution to generate a new approximation for the Lagrangian dual bound comprises using the at least one corresponding solution in the linear programming procedure.

In accordance with an embodiment, the use of a processor for providing of a corresponding solution to the Lagrangian dual of the constrained binary quadratic programming problem comprises storing the corresponding solution to a file.

In accordance with a broad aspect, there is disclosed a digital computer comprising a central processing unit; a display device; a communication port for operatively connecting the digital computer to a quantum annealer; a memory unit comprising an application for solving the Lagrangian dual of a constrained binary quadratic problem, the application comprising: instructions for obtaining a constrained binary quadratic problem; instructions for iteratively performing a Lagrangian relaxation of the constrained quadratic problem to provide an unconstrained quadratic programming problem; instructions for providing the unconstrained quadratic programming problem to the quantum annealer using the communication port; instructions for obtaining from the quantum annealer via the communication port at least one corresponding solution and for using the at least one corresponding solution to generate a new approximation for a Lagrangian dual bound; instructions for providing a corresponding solution to the Lagrangian dual of the constrained binary quadratic programming problem once a convergence is detected and a data bus for interconnecting the central processing unit, the display device, the communication port and the memory unit.

In accordance with a broad aspect, there is disclosed a non-transitory computer-readable storage medium for storing computer-executable instructions which, when executed, cause a digital computer to perform a method for solving the Lagrangian dual of a constrained binary quadratic programming problem, the method comprising obtaining a constrained quadratic binary programming problem; until a convergence is detected, iteratively: performing a Lagrangian relaxation of the constrained quadratic binary programming problem to provide an unconstrained quadratic binary programming problem; providing the unconstrained quadratic binary programming problem to a quantum annealer; obtaining from the quantum annealer at least one corresponding solution; using the at least one corresponding solution to generate a new approximation for a Lagrangian dual bound and providing a corresponding solution to the Lagrangian dual of the constrained binary quadratic programming problem causing the convergence.

In accordance with an embodiment, there is disclosed a use of the method disclosed herein for solving a maximum weighted k-clique problem.

According to a broad aspect, there is disclosed a method for solving the Lagrangian dual of a constrained binary quadratic programming problem, the method comprising obtaining a constrained quadratic binary programming problem; until a convergence is detected, iteratively, performing a Lagrangian relaxation of the constrained quadratic binary programming problem to provide an unconstrained quadratic binary programming problem, providing the unconstrained quadratic binary programming problem to a quantum annealer, obtaining from the quantum annealer at least one corresponding solution, using the at least one corresponding solution to generate a new approximation for a Lagrangian dual bound; and providing a corresponding solution to the Lagrangian dual of the constrained binary quadratic programming problem after the convergence.

An advantage of the method disclosed herein is that it provides a method for using Lagrangian duality in various applications, for example finding Lagrangian based bounds to integer and mixed-integer programming problems using a quantum annealer.

It will be further appreciated that the method disclosed herein greatly improves the processing of a system for solving a Lagrangian dual of a constrained binary quadratic programming problem which is of great advantage.

BRIEF DESCRIPTION OF THE DRAWINGS

In order that the invention may be readily understood, embodiments of the invention are illustrated by way of example in the accompanying drawings.

Figure 1:
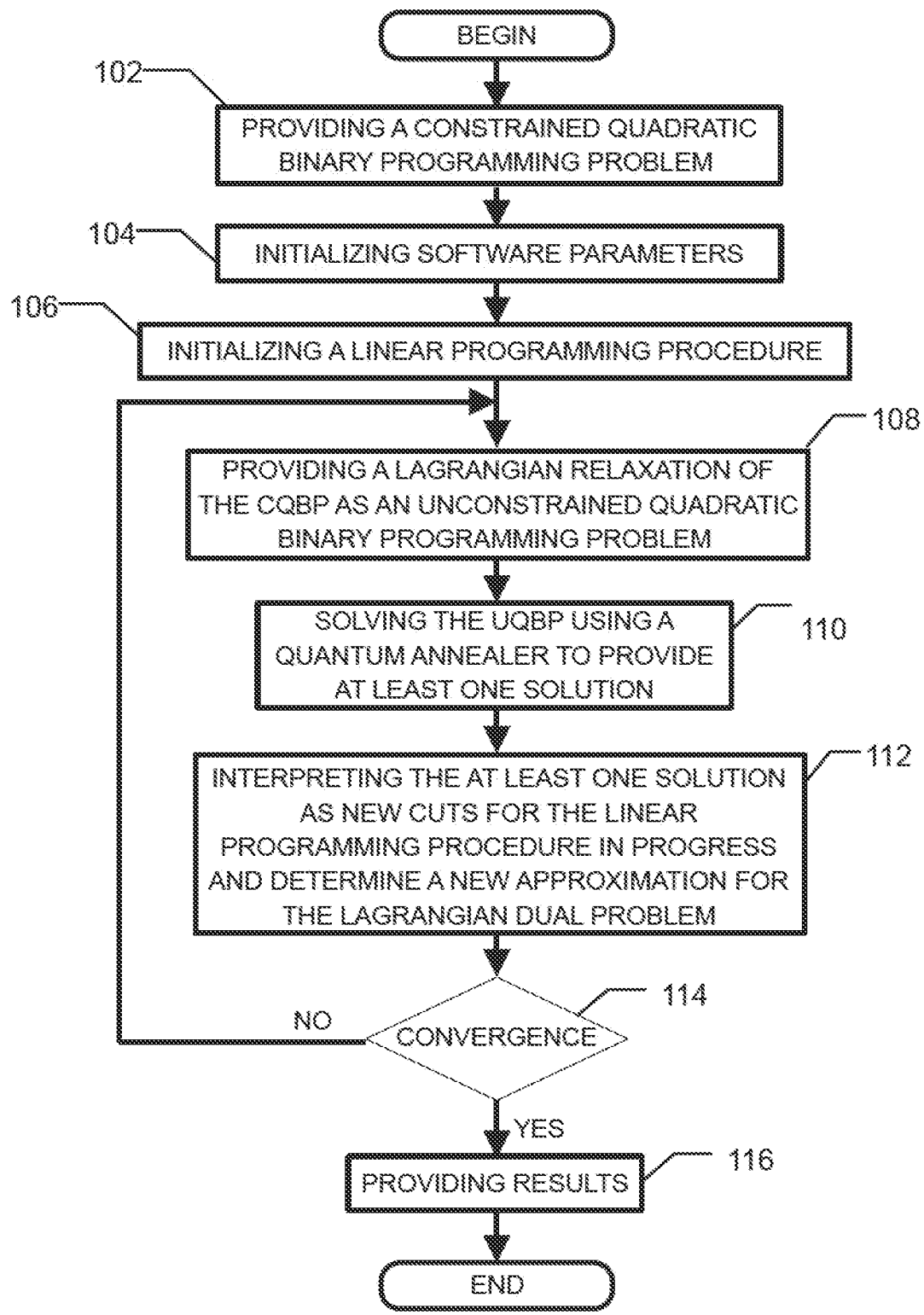
FIG. 1 is a flowchart that shows an embodiment of a method for solving the Lagrangian dual of a constrained binary quadratic programming problem using a quantum annealer.

Further details of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an", "the" and "at least one" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "e.g." and like terms mean "for example," and thus does not limit the term or phrase it explains. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limits the term or phrase it explains. For example, in the sentence "the computer sends data (i.e., instructions) over the Internet," the term "i.e." explains that "instructions" are the "data" that the computer sends over the Internet.

The term "constrained binary quadratic programming" problem and like terms mean finding the minimum of a quadratic real polynomial $y=f(x)$ in several binary variables $x=(x_1, \ldots, x_n)$ subject to a (possibly empty) family of equality constraints determined by a (possibly empty) family of m equations $g_j(x)=0$ for $j=1, \ldots, m$ and a (possibly empty) family of inequality constraints determined by a (possibly empty) family of $\ell$ inequalities $h_j(x) \leq 0$ for $j=1, \ldots, \ell$ Here all functions $g_i$ and $h_j$ are polynomials of degree at most two.

$$\min f(x)$$
$$\text{subject to } g_i(x) = 0 \quad \forall i \in \{1, \ldots, m\}$$
$$h_j(x) \leq 0 \quad \forall j \in \{1, \ldots, \ell\}$$
$$x_k \in \{0, 1\} \quad \forall k \in \{1, \ldots, n\}$$

The above constrained binary quadratic programming problem will be denoted by (P) and the optimal value of it will be denoted by $\upsilon(P)$. An optimal solution x, i.e. a vector at which the objective function attains the value $\upsilon(P)$ will be denoted by $x^*$.

It will be appreciated that any quadratic polynomial $y=q(x)$ can be represented in matrix notation $y=q(x)=x^t Ax + B^t x + C$ where the matrix A is a real symmetric positive semi-definite square matrix of size n, B is a real vector of size n, and C is a real number.

It will be further appreciated that according to the equality $x_i^2 = x_i (i=1, \ldots, n)$ for the binary variables, it can be assumed that the function $q(x)$ is given without linear terms; that is, $q(x)=x^t Qx+b$, where the matrix Q is a real symmetric square matrix of size n, and b is a real constant.

The term "unconstrained binary quadratic programming" problem and like terms mean finding a minimum of an objective function $y=x^t Qx+b$ where Q is a symmetric square real matrix of size n, and b is a real number, also known as the bias of the objective function. The domain of the function is all vectors $x \in B^n = \{0, 1\}^n$ with binary entries.

The term "Lagrangian relaxation" of the constrained binary quadratic programming problem (P), corresponding to fixed Lagrange multipliers $\lambda \in \mathbb{R}^m$ and $\mu \in \mathbb{R}^\ell_{\geq 0}$ and means solving the following optimization problem:

$$\min_{x \in \{0,1\}^n} \left( f(x) + \sum_{i=1}^m \lambda_i g_i(x) + \sum_{j=1}^\ell \mu_j h_j(x) \right)$$

The value of the above optimization is denoted as $\delta_P(\lambda, \mu)$ and is known to be a lower bound for the optimal value of the original constrained binary quadratic programming, that is, $\delta_P(\lambda, \mu) \leq \upsilon(P)$.

The term "Lagrangian dual" of a constrained binary quadratic programming problem, is used for the following optimization problem:

$$\max_{\lambda, \mu} \min_x \left( f(x) + \sum_{i=1}^m \lambda_i g_i(x) + \sum_{j=1}^\ell \mu_j h_j(x) \right)$$
$$\text{subject to } x \in \{0, 1\}^n$$
$$\lambda \in \mathbb{R}^m$$
$$\mu \in \mathbb{R}^\ell_{\geq 0}$$

The value of the above optimization is denoted by $\delta(P)$ and is known to be a lower bound for the optimal value of the original constrained binary quadratic programming, that is, $\delta(P) \leq \upsilon(P)$. This value is unique and is also called the "Lagrangian dual bound" for the original constrained binary quadratic programming problem.

The term "optimal Lagrange multiplier," and the like, will refer to a, not necessarily unique, set of optimal points $\lambda^*$ and $\mu^*$ at which the value $\delta(P)$ is attained for the above optimization problem.

The term "solution to the Lagrangian dual problem" of an original constrained binary quadratic programming problem, refers to the following collection of information received after solving the Lagrangian dual problem: (1) the (unique) optimal value of the Lagrangian dual problem, also known as the Lagrangian dual bound; (2) a set of (not necessarily unique) optimal Lagrange multipliers as described above; and (3) a set of (non necessarily unique) binary vectors at which the optimal value of the Lagrangian dual problem is obtained at the given optimal Lagrange multipliers.

One widely studied class of constrained binary quadratic programming problems is that of linearly constrained ones. In this case the functions $g_i$ and $h_j$ are all linear. Hence the problem can be rewritten as $$\min \ f(x)$$
$$\text{subject to } A_{eq}x = b_{eq}$$
$$A_{ineq}x \le b_{ineq}$$
$$x_i \in \{0, 1\} \forall \ i \in \{1, \ldots, n\}$$

where $y=f(x)$ is a quadratic polynomial of several binary variables $x=(x_1, \ldots, x_n)$ subject to a (possibly empty) family of linear equality constraints determined by a linear system $A_{eq}x=b_{eq}$ where $A_{eq}$ is a matrix of size m×n and $b_{eq}$ is a column matrix of size m×1 and a (possibly empty) family of inequality constraints determined by $A_{ineq}x \le b_{ineq}$ where $A_{ineq}$ is a matrix of size $\ell$×n and $b_{ineq}$ is a column matrix of size $\ell$×1. A Lagrangian relaxation of the above problem can be written as $$\min_{x} \ f(x) + \lambda^t(A_{eq}x - b) + \mu^t(A_{ineq}x - b_{ineq})$$
$$\text{subject to } x_i \in \{0, 1\}, \ \forall_i \in \{1, \ldots, n\}$$

for given Lagrange multipliers $\lambda$ and $\mu$ and the Lagrangian dual can be stated as $$\max_{\lambda, \mu} \ \min_{x} (f(x) + \lambda^t(A_{eq}x - b) + \mu^t(A_{ineq}x - b_{ineq}))$$
$$\text{subject to } x_i \in \{0, 1\}, \ \forall \ i \in \{1, \ldots, n\}$$
$$\lambda \in \mathbb{R}^m$$
$$\mu \in \mathbb{R}^\ell_{\ge 0}$$

The term "quantum annealer" and like terms mean a system consisting of one or many types of hardware that can find optimal or sub-optimal solutions to an unconstrained binary quadratic programming problem. An example of this is a system consisting of a digital computer embedding a binary quadratic programming problem as an Ising spin model, attached to an analog computer that carries optimization of a configuration of spins in an Ising spin model using quantum annealing as described, for example, in Farhi, E. et al., "Quantum Adiabatic Evolution Algorithms versus Simulated Annealing" arXiv.org:quant-ph/0201031 (2002), pp 1-16. An embodiment of such analog computer is disclosed by McGeoch, Catherine C. and Cong Wang, (2013), "Experimental Evaluation of an Adiabatic Quantum Computing System for Combinatorial Optimization" Computing Frontiers." May 14-16, 2013 (www.cs.amherst.edu) and also disclosed in the patent application US2006/0225165. It will be appreciated that the "quantum annealer" may also be comprised of "classical components," such as a classical computer. Accordingly, a "quantum annealer" may be entirely analog or an analog-classical hybrid.

The term "embedding" of a binary optimization problem, and the like, refer to an assignment of a set of the quantum bits $\{q_{i1}, q_{i2}, \ldots, q_{iL_i}\}$ to each binary variable $x_i$. Specifications of the role of such an embedding in solving an unconstrained binary quadratic programming problem and presentation of an efficient algorithm for it are disclosed for instance in "A practical heuristic for finding graph minors"—Jun Cai, William G. Macready, Aidan Roy, in U.S. patent application US 2008/0218519 and in U.S. Pat. No. 8,655,828 B2.

The term "embedding solver," and the like, refer to a function, procedure, and algorithm that consist of instructions for receiving an unconstrained binary quadratic programming problem, carrying a query to the quantum annealer using a provided embedding, and returning at least one result, each result containing a vector of binary entries, representative of a binary point in the domain of the provided unconstrained binary quadratic programming, the value of the objective function of unconstrained binary quadratic programming at that point, and the number of occurrences of the result in the entire number of reads.

The term "callback function," and the like, refer to a user function that is called iteratively by the software throughout the run time. In the system disclosed herein, there is only one callback function which determines how the queries to the quantum annealer are carried. In other words, the embedding solver explained above is provided by the user as a callback function.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It will be appreciated that the invention may be implemented in numerous ways, including as a method, a system, a computer readable medium such as a computer readable storage medium. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task.

With all this in mind, the present invention is directed to a method and system for solving the Lagrangian dual of a constrained binary quadratic programming problem.

Figure 2:
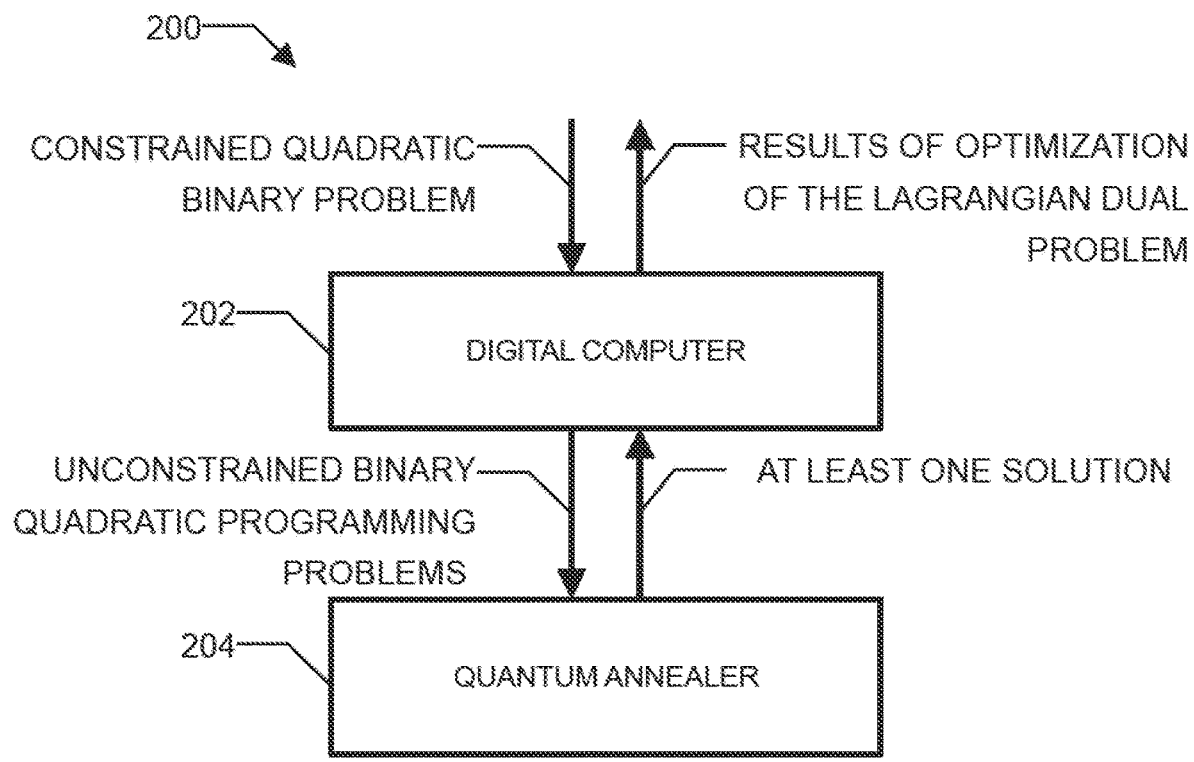
FIG. 2 is a diagram of an embodiment of a system in which the method for solving the Lagrangian dual of a constrained binary quadratic programming problem using a quantum annealer may be implemented. In this embodiment, the system comprises a digital computer and a quantum annealer.

Now referring to FIG. 2, there is shown an embodiment of a system 200 in which an embodiment of the method for solving the Lagrangian dual of a constrained binary quadratic programming problem may be implemented.

The system 200 comprises a digital computer 202 and a quantum annealer 204.

The digital computer 202 receives a constrained binary quadratic programming problem and provides a solution to the Lagrangian dual of the constrained binary quadratic programming problem.

It will be appreciated that the constrained binary quadratic programming problem may be provided according to various embodiments.

In one embodiment, the constrained binary quadratic programming problem is provided by a user interacting with the digital computer 202.

Alternatively, the constrained binary quadratic programming problem is provided by another computer, not shown, operatively connected to the digital computer 202. Alternatively, the constrained binary quadratic programming problem is provided by an independent software package. Alternatively, the constrained binary quadratic programming problem is provided by an intelligent agent.

Similarly, it will be appreciated that the solution to the Lagrangian dual of the constrained binary quadratic programming problem may be provided according to various embodiments.

In accordance with an embodiment, the solution to the Lagrangian dual of the constrained binary quadratic programming problem is provided to the user interacting with the digital computer 202.

Alternatively, the solution to the Lagrangian dual of the constrained binary quadratic programming problem is provided to another computer operatively connected to the digital computer 202.

In fact, it will be appreciated by the skilled addressee that the digital computer 202 may be any type of computer.

In one embodiment, the digital computer 202 is selected from a group consisting of desktop computers, laptop computers, tablet PCs, servers, smartphones, etc.

Figure 3:
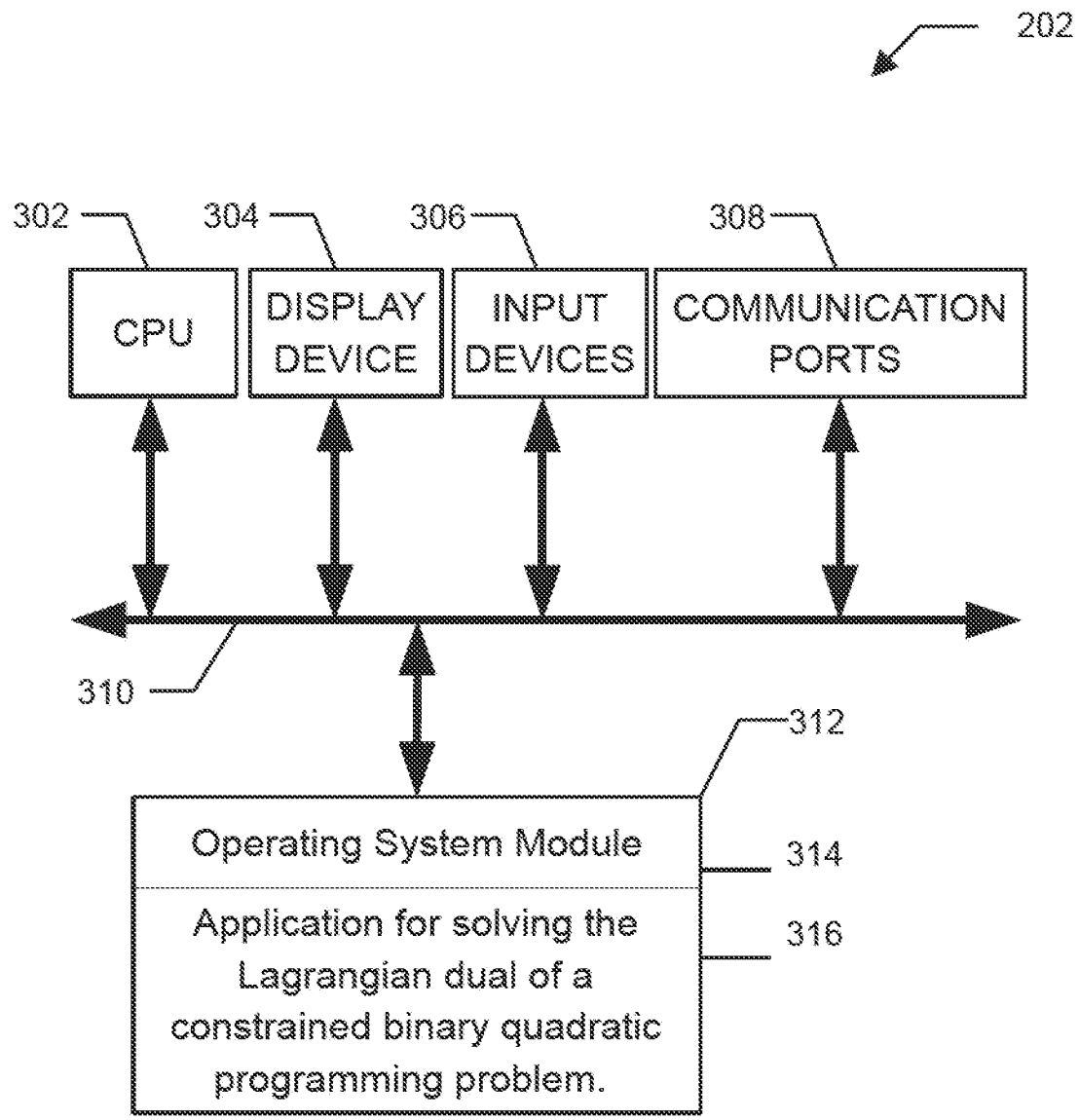
FIG. 3 is a diagram that shows an embodiment of a digital computer used in the system for solving the Lagrangian dual of a constrained binary quadratic programming problem using a quantum annealer.

Now referring to FIG. 3, there is shown an embodiment of a digital computer 202. It will be appreciated that the digital computer 202 may also be broadly referred to as a processor.

In this embodiment, the digital computer 202 comprises a central processing unit (CPU) 302, also referred to as a microprocessor or a processor, a display device 304, input devices 306, communication ports 308, a data bus 310 and a memory unit 312.

The CPU 302 is used for processing computer instructions. The skilled addressee will appreciate that various embodiments of the CPU 302 may be provided.

In one embodiment, the central processing unit 302 is a CPU Core i5-3210M running at 2.5 GHz and manufactured by Intel™.

The display device 304 is used for displaying data to a user. The skilled addressee will appreciate that various types of display device 304 may be used.

In one embodiment, the display device 304 is a standard liquid-crystal display (LCD) monitor.

The communication ports 308 are used for sharing data with the digital computer 202.

The communication ports 308 may comprise, for instance, a universal serial bus (USB) port for connecting a keyboard and a mouse to the digital computer 202.

The communication ports 308 may further comprise a data network communication port such as an IEEE 802.3 port for enabling a connection of the digital computer 202 with another computer via a data network.

The skilled addressee will appreciate that various alternative embodiments of the communication ports 308 may be provided.

In one embodiment, the communication ports 308 comprise an Ethernet port.

The memory unit 312 is used for storing computer-executable instructions.

It will be appreciated that the memory unit 312 comprises, in one embodiment, an operating system module 314.

It will be appreciated by the skilled addressee that the operating system module 314 may be of various types.

In an embodiment, the operating system module 314 is OS X Yosemite (Version 10.10.5) manufactured by Apple™.

The memory unit 312 further comprises an application for solving the Lagrangian dual of a constrained binary quadratic programming problem 316.

The application 316 comprises instructions for obtaining a constrained quadratic binary programming problem.

The application 316 further comprises instructions for iteratively performing a Lagrangian relaxation of the constrained quadratic binary programming problem to provide an unconstrained quadratic binary programming problem; providing the unconstrained quadratic binary programming problem to a quantum annealer; obtaining from the quantum annealer at least one corresponding solution and for using the at least one corresponding solution to generate a new approximation for the Lagrangian dual bound.

The application 316 further comprises instructions for providing a corresponding solution to the Lagrangian dual of the constrained binary quadratic programming problem once a convergence is detected.

Each of the central processing unit 302, the display device 304, the input devices 306, the communication ports 308 and the memory unit 312 is interconnected via the data bus 310.

Now referring back to FIG. 2, it will be appreciated that the quantum annealer 204 is operatively connected to the digital computer 202.

It will be appreciated that the coupling of the quantum annealer 204 to the digital computer 202 may be achieved according to various embodiments.

In one embodiment, the coupling of the quantum annealer 204 to the digital computer 202 is achieved via a data network.

It will be appreciated that the quantum annealer 204 may be of various types.

In one embodiment, the quantum annealer 204 is manufactured by D-Wave Systems Inc. More information on this embodiment of a quantum annealer applicable to 204 may be found at www.dwavesys.com. The skilled addressee will appreciate that various alternative embodiments may be provided for the quantum annealer 204.

More precisely, the quantum annealer 204 receives an unconstrained binary quadratic programming problem from the digital computer 202.

The quantum annealer 204 is capable of solving the unconstrained binary quadratic programming problem and of providing at least one corresponding solution. In the case where a plurality of corresponding solutions is provided, the plurality of corresponding solutions may comprise optimal and suboptimal solutions.

The at least one corresponding solution is provided by the quantum annealer 204 to the digital computer 202.

Now referring to FIG. 1 and according to processing step 102, a constrained binary quadratic programming problem is provided. It will be appreciated that in one embodiment the processor is used for providing the constrained binary quadratic programming problem.

Figure 4:
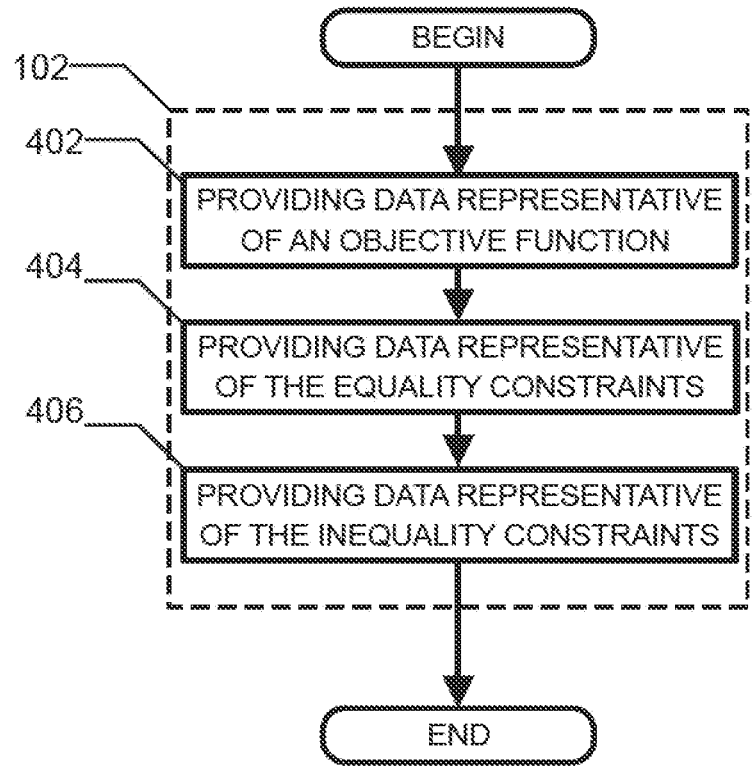
FIG. 4 is a flowchart that shows an embodiment for providing a constrained binary programming problem.

Now referring to FIG. 4, there is shown an embodiment for providing a constrained binary quadratic programming problem.

As mentioned above, the constrained binary quadratic programming problem can be referred to as:

$$\min\ f(x)$$
$$\text{subject to}\ g_i(x) = 0 \quad \forall\, i \in \{1, \ldots, m\}$$
$$h_j(x) \leq 0 \quad \forall\, j \in \{1, \ldots, \ell\}$$
$$x_k \in \{0, 1\} \quad \forall\, k \in \{1, \ldots, n\}$$

According to processing step 402, data representative of an objective function $f(x)$ are provided. It will be appreciated that in one embodiment the processor is used for providing the data representative of an objective function $f(x)$.

According to processing step 404, data representative of the equality constraints are provided. It will be appreciated that in one embodiment the processor is used for providing the data representative of the equality constraints.

According to processing step 406, data representative of the inequality constraints are provided. It will be appreciated that in one embodiment the processor is used for providing the data representative of the inequality constraints.

It will be appreciated that the providing of a constrained binary quadratic programming problem may be performed according to various embodiments.

As mentioned above and in one embodiment, the constrained binary quadratic programming problem is provided by a user interacting with the digital computer 202. Alternatively, the constrained binary quadratic programming problem is provided by another computer operatively connected to the digital computer 202. Alternatively, the constrained binary quadratic programming problem is provided by an independent software package. Alternatively, the constrained binary quadratic programming problem is provided by an intelligent agent.

Now referring to FIG. 1 and according to processing step 104, parameters of the software are initialized. It will be appreciated that in one embodiment the processor is used for initializing the parameters of the software.

Figure 5:
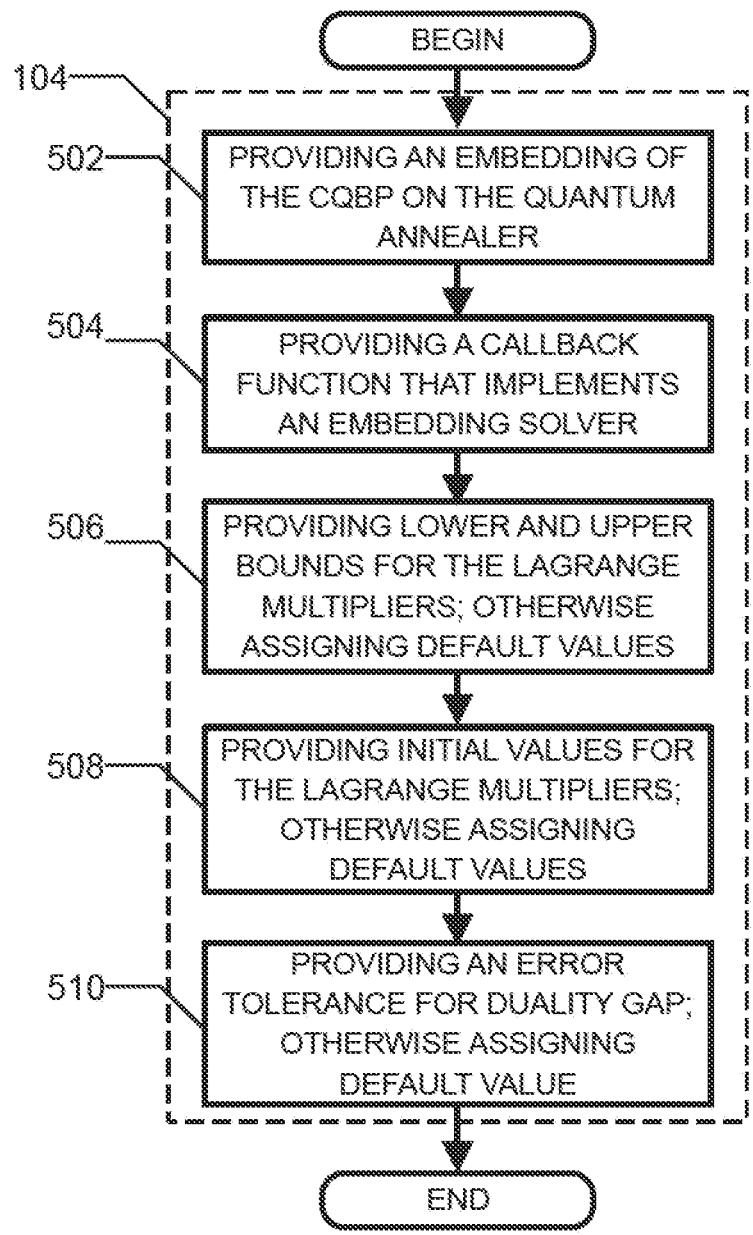
FIG. 5 is a flowchart that shows an embodiment for initializing software parameters used in an embodiment of the method for solving the Lagrangian dual of a constrained binary quadratic programming problem.

Now referring to FIG. 5, there is shown an embodiment for initializing parameters or using default values for them.

In one embodiment, the software parameters are obtained by the processor from at least one of a user, a computer, a software package and an intelligent agent.

According to processing step 502, data representative of an embedding of the constrained binary quadratic programming problem on the quantum annealer are provided. In one embodiment the processor is used for providing the data representative of an embedding of the constrained binary quadratic programming problem on the quantum annealer. The embedding should be such that it respects all logical couplings between variables as they occur in the functions $f(x), g_1(x), \ldots, g_m(x)$ and $h_1(x), \ldots, h_\ell(x)$. In other words the chains of qubits corresponding to two variable $x_r$ and $x_s$ should have a coupling between them whenever there is a nonzero coefficient for the term $x_r x_s$, in at least one of the functions $f(x), g_1(x), \ldots, g_m(x)$ and $h_1(x), \ldots, h_\ell(x)$.

In one embodiment, the data comprise an array of n sets, with each entry being a set $\{q_{i1}, \ldots, q_{il_i}\}$ of quantum bits of the annealer. Still in one embodiment, the data of the embedding of the constrained binary quadratic programming problem are stored in the reserved name embeddings, in the namespace ORACLE. Hence in ORACLE::embeddings.

Still referring to FIG. 5 and according to processing step 504, an embedding solver function is provided as a callback function. It will be appreciated that in one embodiment the processor is used for providing an embedding solver function. In one embodiment, the function is implemented by the user in the namespace ORACLE, as ORACLE::solve_qubo.

The input parameter of the callback function is a pointer to an instance of the data type ORACLE::qubo, representative of an unconstrained binary quadratic programming neglecting the corresponding bias of it.

The output of the call back function is a pointer to an instance of the type ORACLE::result, representative of a list of optimal and suboptimal solutions to the unconstrained binary quadratic programming problem.

The following is an example of a code snippet in C++ for providing the callback function using the API developed by DWave:

```
#include "dwave_sapi.h"
#include <ostream>
#include <string.h>
ORACLE::result* ORACLE::solve_qubo(ORACLE::qubo& qubo) {
  sapi_Solver* embedding_solver = NULL;
  char err_msg[SAPI_ERROR_MAX_SIZE];
  sapi_Connection* connection = NULL;
    const char* url = "https://.../";
    const char* token = "...";
    const char* system = "...";
    sapi_remoteConnection(url, token, NULL, &connection, err_msg);
    sapi_getSolver(connection, system, &solver, err_msg);
    sapi_SolveParameters params;
    params.len =1;
    params.elements= new (sapi_SolveParameterEntry*)[1];
    params.elements[0].name= "num_reads";
    stringstream num_reads_string << 100 * qubo.dim;
    params.elements[0].value= num_reads_string.str( )).c_str( );
    sapi_embeddingSolver(solver,*ORACLE::embeddings,
    embedding_solver, err_msg);
    QUBO::result* result = NULL;
    Sapi_solveQubo(embedding_solver, qubo, params, &result,
    err_msg);
    return qubo_result;
}
```

It will be appreciated that, in one embodiment, the providing of the unconstrained binary optimization problem to the quantum annealer is achieved using a processor.

More precisely, it will be appreciated that in one embodiment a token system is used over the Internet to provide access to the quantum annealer remotely and to authenticate use.

It will be appreciated that in one embodiment the at least one solution is provided in a table by the quantum annealer, according to the instructions of use of the quantum annealer. In one embodiment, the DWave system, provides these solutions in the data type sapi_IsingResult* which is then type-casted automatically to an instance of QUBO::result*.

Still referring to FIG. 5 and according to processing step 506, lower and upper bounds for Lagrange multipliers are provided. It will be appreciated that in one embodiment the lower and upper bounds for Lagrange multipliers are provided using the processor.

It will be appreciated that in one embodiment the providing of these real numbers of type double is achieved by overwriting the names ORACLE::dual_lb and ORACLE::dual_ub. Each of these types will be required to contain an array of doubles of size $m+\ell$. The first m entries of these arrays represent, respectively, the lower and upper bounds for the Lagrange multipliers corresponding to the m equality constraints and the last $\ell$ of them represent, respectively, the lower and upper bounds for the Lagrange multipliers corresponding to the $\ell$ inequality constraints.

It will be appreciated that if these names are not overwritten, the values of them are initialized with the default values.

In the mathematical formulae below, the vector of lower bounds is denoted by $lb=(lb_1, \ldots, lb_{m+\ell})$ and the vector of upper bounds is denoted by $ub=(ub_1, \ldots, ub_{m+\ell})$.

In one embodiment, the default lower bound for a Lagrange multiplier corresponding to an equality constraint is −1e6 and the default upper bound for it is +1e6.

The default lower bound for a Lagrange multiplier corresponding to an inequality constraint is 0 and the default upper bound for it is +1e6.

Still referring to FIG. 5 and according to processing step 508, initial values for the Lagrange multipliers are provided. It will be appreciated that in one embodiment the initial values for the Lagrange multipliers are provided using the processor.

In fact, it will be appreciated that the providing of these real valued numbers are achieved by overwriting the name ORACLE::dual_init_val with an array of doubles of size m+ $\ell$. If this name is not overwritten, the values are initialized with default values.

The default initial value for any of the Lagrange multipliers, corresponding to any of equality or inequality constraints, is 0.

In the mathematical formulae below, the vector of all initial values of Lagrange multipliers is denoted by init= $(init_1, \ldots, init_{m-\ell})$.

According to processing step 510, an error tolerance value for equality and inequality conditions is provided in the software. It will be appreciated that in one embodiment the error tolerance value for equality and inequality conditions is provided using the processor.

Unless overwritten by the user and according to one embodiment, the error tolerance value is initialized to 1e-5 and stored as ORACLE::tol. The error tolerance value is used in several points in the software.

The Lagrangian dual bound and the value of the best feasible solution are considered equal if their difference is less that ORACLE::tol, in which case strong duality is assumed to hold.

More generally, any system of linear inequalities LHS≤RHS is considered satisfied if the value of all entries in LHS−RHS is at most ORACLE::tol.

Similarly, any system of linear equalities LHS=RHS is considered satisfied if the absolute value of all entries in LHS−RHS is at most ORACLE::tol.

Now referring back to FIG. 1 and according to processing step 106 a linear programming procedure is initialized.

It will be appreciated that the linear programming procedure will be carried iteratively during the entire runtime of the method and will terminate once the result of it converges; i.e., it does not improve in the two consecutive iterations.

In first iteration, the linear programming problem, referred to as (L), is the following:

$$\max\ y$$
$$\text{subject to}\ y \in (-\infty, +\infty)$$

-continued
$$\lambda_i \in (-lb_i, ub_i) \forall\ i \in \{1, \ldots, m\}$$
$$\mu_j \in (-lb_{j+m}, ub_{j+m}) \forall\ j \in \{1, \ldots, \ell\}$$

At this point, the value of y is set to y*=+∞ and the variables $\lambda_i$ and $\mu_i$ play no role in the objective function or in the constraints. The vectors $\lambda=(\lambda_1, \ldots, \lambda_m)$ and $\mu=(\mu_1, \ldots, \mu\ell)$ will represent the Lagrange multipliers in the linear programming problem (L) formulated above.

It will be appreciated that the values of the variables $\lambda_i$ and $\mu_j$ may be set to any arbitrary feasible ones $\lambda^*_i=init_i$ ($\forall i=1, \ldots, m$) and $\mu^*_j=init_{j+m}(\forall j=1, \ldots, m)$.

It will be appreciated that in further processing steps a number of inequality constraints will be added to the linear programming problem (L) and a simplex-based linear programming method proceeds to find new optimal values for y*, $\lambda^*$ and $\mu^*$ such that they maximize y and satisfy all added constraints.

According to processing step 108, the Lagrangian relaxation of the constrained binary quadratic programming problem corresponding to the Lagrange multipliers $\lambda^*$ and $\mu^*$ are provided.

As mentioned above, the Lagrangian relaxation of the constrained binary quadratic programming problem corresponding to the Lagrange multipliers $\lambda^*$ and $\mu^*$ is the following optimization problem:

$$\min_{x \in \{0,1\}^n} \left( f(x) + \sum_{i=1}^{m} \lambda_i^* g_i(x) + \sum_{j=1}^{\ell} \mu_j^* h_j(x) \right)$$

It will be appreciated that this optimization problem is an unconstrained binary quadratic programming problem and therefore can be completely determined by a symmetric real matrix Q of size n and a bias constant b, representative of an objective function of the form $x^T Qx+b$ in n binary variables. It will be appreciated that the unconstrained binary quadratic programming problem is provided to the quantum annealer. As mentioned above, the unconstrained binary quadratic problem may be provided to the quantum annealer according to various embodiments.

In one embodiment, the information of this unconstrained binary quadratic programming problem is stored in a variable Q of type ORACLE::qubo forgetting the bias term.

Still referring to FIG. 1 and according to processing step 110, the call back function ORACLE::solve_qubo is now called with input Q to provide at least one corresponding solution for the unconstrained binary quadratic programming problem from the quantum annealer.

It will be appreciated that the at least one corresponding solution of the unconstrained binary quadratic programming is achieved with a pointer to an instance of type ORACLE::result.

Now referring to processing step 112, each of the at least one corresponding solution provided according to processing step 110, is used to generate a new linear constraint (a.k.a. cut) for the linear programming problem (L).

Figure 6:
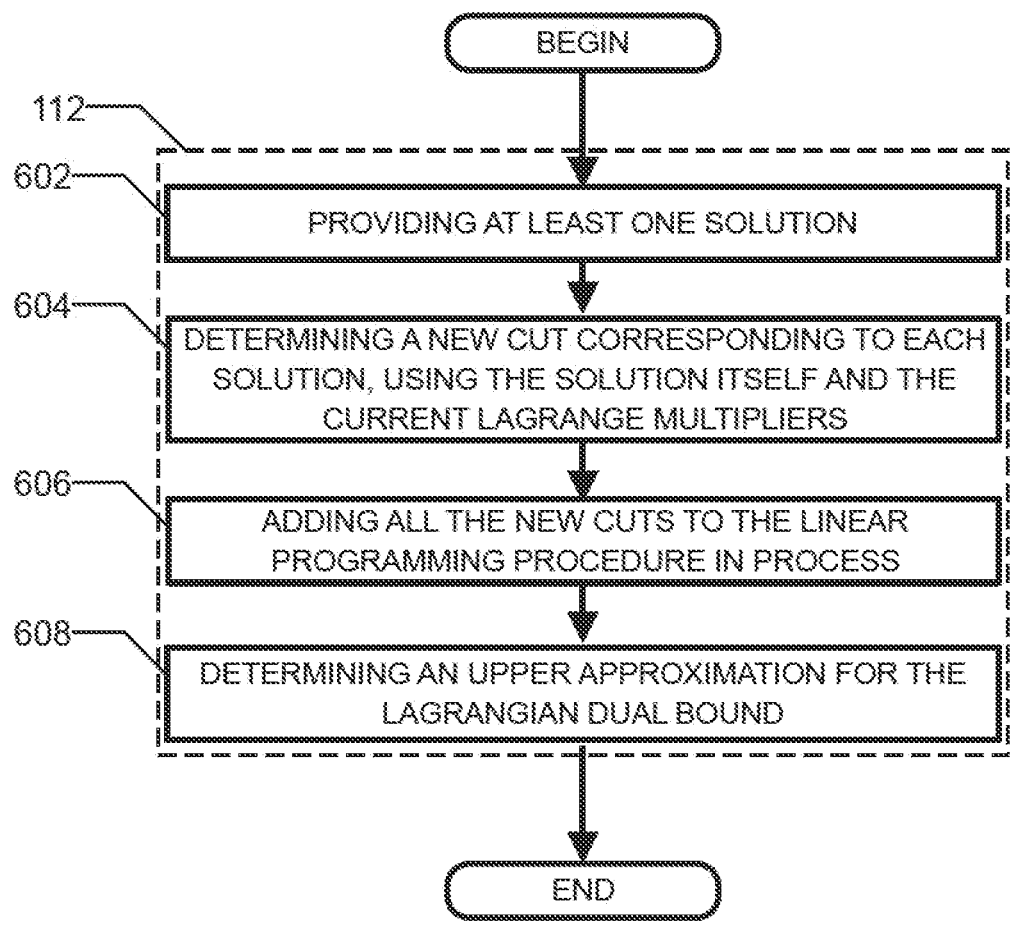
FIG. 6 is a flowchart that shows an embodiment for interpreting the at least one solution provided by the quantum annealer as new cuts for a linear programming procedure in progress in order to determine a new upper approximation for the Lagrangian dual bound of a constrained binary quadratic programming problem.

Now referring to FIG. 6, there is shown an embodiment for interpreting the at least one corresponding solution as new cuts for the linear programming procedure in progress and for determining a new approximation for the Lagrangian dual bound.

According to processing step 602, at least one corresponding solution is provided. In the case where the at least one corresponding solution comprises a plurality of solutions, the plurality of solutions S comprises optimal as well as suboptimal solutions as mentioned above.

According to processing step 604, a new cut corresponding to each solution is determined using the solution itself and the current Lagrange multipliers.

In fact and given a binary vector s of size n, it will be appreciated that the following inequality cuts out a half-space of the space $\mathbb{R}^m x \mathbb{R}^\ell_{\geq} x \mathbb{R}$, of the Lagrange multipliers and the variable y.

$$y \leq f(s) + \sum_{i=1}^m \lambda^*_i g_i(s) + \sum_{j=1}^\ell \mu^*_j h_j(s)$$

According to processing step 606, all the new cuts corresponding to all vectors s∈S are added to the linear programming procedure (L) in progress.

Using a simplex-based linear programming method, the previous solution to the linear programming problem (L) is now modified to a solution to the modified version of the linear programming problem (L) formulated below:

$$\max \; y$$
$$\text{subject to all previous constraints}$$
$$\text{and} \; y \leq f(s) + \sum_{i=1}^m \lambda^*_i g_i(s) + \sum_{j=1}^\ell \mu^*_j h_j(s), \forall \, s \in S$$

According to processing step 608, the optimal value of y* and the optimal multipliers λ* and μ* are updated by solving the modified linear programming problem (L), and y* is now recognized as an upper approximation for the Lagrangian dual bound.

Referring to FIG. 1 and according to processing step 114, a test is performed in order to find out if the optimal value of y* is or not improved from a previous value.

In the case where the optimal value of y* does not improve and according to processing step 116, the results of the optimization are reported. It will be appreciated that in one embodiment, the results of the optimization are provided using the processor.

It will be appreciated that in one embodiment, the output of this method comprises the value of y* representative of the optimal value, and δ(P) of the Lagrangian dual problem corresponding to the constrained binary quadratic programming problem formulated above.

The output of this method further comprises the optimal multipliers λ* and μ*, representative of a set of Lagrange multipliers at which the value δ(P) is attained by the Lagrangian dual of the constrained binary quadratic programming problem.

Still in this embodiment, the output of the method further comprises the minimum value encountered for ƒ(s) among all solutions s generated by the quantum annealer and provided by the callback function ORACLE::solve_qubo.

Finally, the output comprises an indicator of whether δ(P) and the minimum value encountered for ƒ(s) are at most of distance ORACLE::tol from each other.

In one embodiment, the above information is stored using the digital computer in a file.

It will be appreciated that a non-transitory computer-readable storage medium is further disclosed. The non-transitory computer-readable storage medium is used for storing computer-executable instructions which, when executed, cause a digital computer to perform a method for solving the Lagrangian dual of a constrained binary quadratic programming problem, the method comprising obtaining a constrained quadratic binary programming problem; until a convergence is detected, iteratively, performing a Lagrangian relaxation of the constrained quadratic binary programming problem to provide an unconstrained quadratic binary programming problem, providing the unconstrained quadratic binary programming problem to a quantum annealer, obtaining from the quantum annealer at least one corresponding solution, using the at least one corresponding solution to generate a new approximation for the Lagrangian dual bound; and providing a corresponding solution to the Lagrangian dual of the constrained binary quadratic programming problem after the convergence.

It will be appreciated that an advantage of the method disclosed herein is that it enables an efficient method for finding the Lagrangian dual bound for a constrained binary quadratic programming problem using a quantum annealer.

It will be further appreciated that the method disclosed herein improves the processing of a system for solving the Lagrangian dual of a constrained binary quadratic programming problem.

It will be appreciated that the method disclosed herein may be used for solving various problems.

For instance, the method disclosed herein may be used for solving the maximum weighted k-clique problem. The maximum weighted k-clique problem may be formulated as:

$$\max \; x^t A x$$
$$\text{subject to} \; \sum_{i=1}^n x_1 = k$$
$$x_1 \in \{0, 1\} \forall \, i \in \{1, \ldots, n\}$$

In this embodiment, A is a symmetric square matrix of size n representing the weights of edges of a graph with n vertices. The binary variable $x_i$ represents selection of the vertex labelled by positive integer i∈{1, . . . , n}.

It is appreciated that the mentioned maximization problem may be written as the minimization of the negative of the objective function:

$$\min \; -x^t A x$$
$$\text{subject to} \; \sum_{i=1}^n x_1 = k$$
$$x_1 \in \{0, 1\} \forall \, i \in \{1, \ldots, n\}$$

In one embodiment, let a graph with 5 vertices, represents a group of 5 coworkers. To each pair of coworkers, a utility factor is assigned for the collaboration between the two coworkers. The utilities can be represented with an upper triangular matrix:

$$W = \begin{pmatrix} 0 & 0 & 3 & 5 & 2 \\ 0 & 0 & 1 & -1 & 4 \\ 0 & 0 & 0 & 7 & 3 \\ 0 & 0 & 0 & 0 & 0 \\ 0 & 0 & 0 & 0 & 0 \end{pmatrix}$$

For example, the utility of collaboration of person 3 with person 5 is 3.

The utility matrix W may as well be represented by the 5×5 symmetric matrix $A=\frac{1}{2}(W+W^t)$.

$$A = \begin{pmatrix} 0 & 0 & 1.5 & 2.5 & 1 \\ 0 & 0 & 0.5 & -0.5 & 2 \\ 1.5 & 0.5 & 0 & 3.5 & 1.5 \\ 2.5 & -0.5 & 3.5 & 0 & 0 \\ 1 & 2 & 1.5 & 0 & 0 \end{pmatrix}$$

The problem of selecting the most productive team of 3 people amongst the 5 coworkers is then an instance of the maximum weighted 3-clique problem which is denoted by (C):

$$\min \; -x^t A x$$
$$\text{subject to} \; \sum_{i=1}^{5} x_1 - 3 = 0$$
$$x_1, \ldots, x_5 \in \{0, 1\}$$

The single constraint of (C), indicates that there is only a single Lagrange multiplier, denoted by $\lambda$, present in any Lagrangian relaxation of it. The lower and upper bounds −10 and 10 are provided for the Lagrange multiplier with initial value 0.

A linear programming problem is then initiated as:

$$\max \; y$$
$$\text{subject to} \; y \in (-\infty, +\infty)$$
$$\lambda \in (-10, 10)$$

which initially has $+\infty$ as optimal solution.

At the initial Lagrange multiplier $\lambda=0$ the unconstrained quadratic binary programming problem:

$$\min_{x \in \{0,1\}^n} -x^t A x$$

is solved by a quantum annealer resulting the optimal value −24 obtained at the binary vector (1, 1, 1, 1, 1).

The linear programming problem is then modified to:

$$\max \; y$$
$$y \leq -24 + 2\lambda$$
$$\lambda \in (-10, 10)$$

A simplex-based linear programming method gives an optimal value of −4 obtained at $\lambda=10$ for this linear programming problem.

At the new Lagrangian multiplier $\lambda=10$, the unconstrained quadratic binary programming problem:

$$\min_{x \in \{0,1\}^n} -x^t A x + 10\left(\sum_{i=1}^{5} x - 3\right)$$

is solved by a quantum annealer resulting the optimal value −30 obtained at the binary vector (0, 0, 0, 0, 0).

The linear programming problem is then modified to $$\max \; y$$
$$\text{subject to} \; y \leq -24 + 2\lambda$$
$$y \leq -3\lambda$$
$$\lambda \in (-10, 10)$$

A simplex-based linear programming method gives an optimal value of −30 obtained at $\lambda=4.8$ for this linear programming problem.

At the new Lagrangian multiplier $\lambda=4.8$, the unconstrained quadratic binary programming problem:

$$\min_{x \in \{0,1\}^n} -x^t A x + 4.8\left(\sum_{i=1}^{5} x - 3\right)$$

is solved by a quantum annealer resulting the optimal value −15.2 obtained at the binary vector (1, 0, 1, 1, 1).

The linear programming problem is then modified to:

$$\max \; y$$
$$\text{subject to} \; y \leq -24 + 2\lambda$$
$$y \leq -3\lambda$$
$$y \leq -20 + \lambda$$
$$\lambda \in (-10, 10)$$

A simplex-based linear programming method gives an optimal value of −15 obtained at $\lambda=5$ for this linear programming problem.

Finally, at the new Lagrangian multiplier $\lambda=5$, the unconstrained quadratic binary programming problem $$\min_{x \in \{0,1\}^n} -x^t A x + 5\left(\sum_{i=1}^{5} x - 3\right)$$

is solved by a quantum annealer resulting the optimal value −15 obtained at the binary vector (1, 0, 1, 1, 0).

$$\max \; y$$
$$\text{subject to} \; y \leq -24 + 2\lambda$$
$$y \leq -3\lambda$$
$$y \leq -20 + \lambda$$
$$y \leq -15$$
$$\lambda \in (-10, 10)$$

A simplex-based linear programming method gives an optimal value of −15 obtained at $\lambda=5$ for this linear programming problem.

Since the optimal value of the linear program, has not improved from the previous iteration, convergence has occurred.

The best known feasible solution is (1, 0, 1, 1, 0) and the value of the objective function of (C) at this point is −15.

Since the optimal value of the linear program is also −15 strong duality has occurred. The output of the method is (1) the Lagrangian dual bound −15, (2) the feasible binary vector (1, 0, 1, 1, 0) and (3) a flag indicating strong duality has occurred.

For the application at hand, the solution to the method disclosed is interpreted as the selection of a team of 3 people, consisting of person 1, 3 and 4 as the most productive team of size 3, amongst the 5 coworkers.

The skilled addressee will appreciate that the method disclosed herein is therefore of great advantage for solving this problem. In fact, the method disclosed greatly improves the processing of a system used for solving such problem.

Although the above description relates to specific embodiments as presently contemplated by the inventors, it will be understood that the invention in its broad aspect includes functional equivalents of the elements described herein.

What is claimed is:

1. A method for solving a computational problem comprising a Lagrangian dual of a binary polynomially constrained polynomial programming problem, the method comprising:
   (a) providing, at a digital computer, said binary polynomially constrained polynomial programming problem;
   (b) using said digital computer to obtain an unconstrained binary quadratic programming problem representative of a Lagrangian relaxation of said binary polynomially constrained polynomial programming problem at a set of Lagrange multipliers;
   (c) using said digital computer to direct said unconstrained binary quadratic programming problem to a binary optimizer over a communications network for executing said unconstrained binary quadratic programming problem;
   (d) using said digital computer to obtain from said binary optimizer at least one solution corresponding to said unconstrained binary quadratic programming problem;
   (e) using said digital computer to generate an updated set of Lagrange multipliers using said at least one solution corresponding to said unconstrained binary quadratic programming problem; and
   (f) using said digital computer to output a report indicative of at least one solution of said binary polynomially constrained polynomial programming problem based on said updated set of Lagrange multipliers.

2. The method of claim 1, wherein (e) comprises using a linear programming procedure.

3. The method of claim 2, wherein (e) comprises generating one or more linear constraints, wherein each of said at least one solution corresponding to said unconstrained binary quadratic programming problem is associated with a corresponding linear constraint of said one or more linear constraints; defining an updated linear programming problem using at least one of said one or more linear constraints; and solving said updated linear programming problem using said linear programming procedure.

4. The method as claimed in claim 2, wherein the linear programming procedure is carried out until the convergence is detected.

5. The method of claim 1, wherein (b)-(e) are repeated at least one time, and wherein at each repetition said Lagrangian relaxation in (b) is at said updated set of Lagrange multipliers generated during a preceding iteration.

6. The method of claim 5, wherein (b)-(e) are repeated until convergence is detected.

7. The method of claim 1, wherein said binary optimizer comprises at least one of a quantum computer, a quantum annealer, or an opto-electric device.

8. The method of claim 1, wherein (a) comprises:
   (i) obtaining data representative of a polynomial objective function;
   (ii) obtaining data representative of polynomial equality constraints; and
   (iii) obtaining data representative of polynomial inequality constraints.

9. The method of claim 1, wherein said binary polynomially constrained polynomial programming problem is provided by at least one of a user, a computer, a software package, or an intelligent agent.

10. The method of claim 1, wherein (a) further comprises initializing software parameters and initializing a linear programming procedure.

11. The method as claimed in claim 10, wherein said initializing said software parameters comprises:
   (i) providing an embedding of said binary polynomially constrained polynomial programming problem on said binary optimizer;
   (ii) providing an embedding solver function for providing a list of solutions;
   (iii) providing lower and upper bounds or default values for said set of Lagrange multipliers;
   (iii) providing initial values or default values for said set of Lagrange multipliers;
   (iv) providing an error tolerance value for a convergence criteria; and
   (v) providing an integer representative of a limit on a total number of iterations and a limit on a total number of non-improving iterations.

12. The method of claim 1, wherein said binary optimizer comprises a quantum annealer, and wherein (c) comprises:
   (i) using a digital computer to embed said binary polynomially constrained polynomial programming problem as an Ising spin model;
   (ii) providing said Ising spin model to said quantum annealer; and
   (iii) annealing said Ising spin model using said quantum annealer.

13. The method of claim 1, wherein (f) comprises storing said report to a file.

14. A system comprising a digital computer and a binary optimizer communicatively coupled to said digital computer through a communications network, wherein said digital computer is configured to:
   (i) provide a binary polynomially constrained polynomial programming problem;
   (ii) obtain an unconstrained binary quadratic programming problem representative of a Lagrangian relaxation of said binary polynomially constrained polynomial programming problem at a set of Lagrange multipliers;
   (iii) direct said unconstrained binary quadratic programming problem to a binary optimizer over a communications network, wherein said binary optimizer solves said unconstrained binary quadratic programming problem;
   (iv) obtain from said binary optimizer at least one solution corresponding to said unconstrained binary quadratic programming problem;
   (v) generate an updated set of Lagrange multipliers using said at least one solution corresponding to said unconstrained binary quadratic programming problem; and (vi) output a report indicative of at least one solution of said binary polynomially constrained polynomial programming problem based on said updated set of Lagrange multipliers.

15. The system of claim 14, wherein said binary optimizer comprises at least one of a quantum computer, a quantum annealer, or an opto-electric device.

16. The system of claim 14, wherein (v) comprises using a linear programming procedure.

17. The system of claim 16, wherein (v) comprises generating one or more linear constraints, wherein each of said at least one solution corresponding to said unconstrained binary quadratic programming problem is associated with a corresponding linear constraint of said one or more linear constraints; defining an updated linear programming problem using at least one of said one or more of linear constraints; and solving said updated linear programming problem using said linear programming procedure.

18. The system of claim 14, wherein (ii)-(v) are repeated at least one time, and wherein at each repetition said Lagrangian relaxation in (ii) is at said updated set of Lagrange multipliers generated during a preceding iteration.

19. The system of claim 18, wherein (ii)-(v) are repeated until convergence is detected.

20. The system of claim 14, wherein (i) further comprises initializing software parameters and initializing a linear programming procedure.

* * * * *